United States Patent
Karnawat et al.

(10) Patent No.: US 11,916,981 B1
(45) Date of Patent: Feb. 27, 2024

(54) EVALUATING LISTENERS WHO REQUEST TO JOIN A MEDIA PROGRAM

(71) Applicant: Amazon Technologies, Inc., Seattle, WA (US)

(72) Inventors: Rakshit Karnawat, Seattle, WA (US); Sanjeev Kumar, Redmond, WA (US); William Jeffrey Lett, Atlanta, GA (US); Maharshi N. Patel, Marietta, GA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 17/545,680

(22) Filed: Dec. 8, 2021

(51) Int. Cl.
*H04L 65/401* (2022.01)
*H04L 65/1093* (2022.01)
*G10L 15/18* (2013.01)
*H04L 65/611* (2022.01)

(52) U.S. Cl.
CPC ...... *H04L 65/4015* (2013.01); *G10L 15/1815* (2013.01); *H04L 65/1093* (2013.01); *H04L 65/611* (2022.05)

(58) Field of Classification Search
CPC ............... H04L 65/4015; H04L 65/611; H04L 65/1093; G10L 15/1815
See application file for complete search history.

(56) References Cited

U.S. PATENT DOCUMENTS

| | | | |
|---|---|---|---|
| 8,023,800 | B2 | 9/2011 | Concotelli |
| 8,112,720 | B2 | 2/2012 | Curtis |
| 8,560,683 | B2 | 10/2013 | Funk et al. |
| 8,572,243 | B2 | 10/2013 | Funk et al. |

(Continued)

FOREIGN PATENT DOCUMENTS

| | | |
|---|---|---|
| AU | 2013204532 B2 | 11/2014 |
| CA | 2977959 A1 | 9/2016 |

(Continued)

OTHER PUBLICATIONS

Github, "Spotify iOS SDK," GitHub.com, GitHub Inc. and GitHub B.V., Feb. 17, 2021, available at URL: https://github.com/spotify/ios-sdk#how-do-app-remote-calls-work, 10 pages.

(Continued)

*Primary Examiner* — Dhairya A Patel
(74) *Attorney, Agent, or Firm* — Athorus, PLLC

(57) ABSTRACT

During an episode of a media program, a creator of the media program requests that listeners join and participate in the episode. In reply, one or more listeners provide audio data to a control system of the media program, e.g., by speaking utterances that are captured by devices of the listeners. The audio data is processed to identify the users, and to determine attributes of the audio data, to identify words expressed in the audio data, and to determine features such as sentiments or opinions of the audio data. The listeners that provided the data are ranked or scored based on information regarding the respective listeners, the attributes of the audio data, or the words or sentiments. One or more of the listeners are recommended to the creator to be permitted to participate in the episode of the media program, or automatically joined in the episode.

20 Claims, 12 Drawing Sheets

(56) References Cited

U.S. PATENT DOCUMENTS

| | | | |
|---|---|---|---|
| 8,768,782 B1* | 7/2014 | Myslinski | G06F 16/284 |
| | | | 705/26.1 |
| 8,850,301 B1 | 9/2014 | Rose | |
| 9,003,032 B2 | 4/2015 | Funk et al. | |
| 9,369,740 B1 | 6/2016 | Funk et al. | |
| 9,613,636 B2* | 4/2017 | Gibbon | G06F 16/686 |
| 9,706,253 B1 | 7/2017 | Funk et al. | |
| 9,729,596 B2* | 8/2017 | Sanghavi | H04L 65/60 |
| 9,781,491 B2 | 10/2017 | Wilson | |
| 9,872,069 B1 | 1/2018 | Funk et al. | |
| 10,083,169 B1 | 9/2018 | Ghosh et al. | |
| 10,091,547 B2 | 10/2018 | Sheppard et al. | |
| 10,110,952 B1 | 10/2018 | Gupta et al. | |
| 10,135,887 B1 | 11/2018 | Esser et al. | |
| 10,140,364 B1 | 11/2018 | Diamondstein | |
| 10,178,422 B1 | 1/2019 | Panchaksharaiah et al. | |
| 10,178,442 B2 | 1/2019 | Shkedi | |
| 10,313,726 B2 | 6/2019 | Woods et al. | |
| 10,356,476 B2 | 7/2019 | Dharmaji | |
| 10,432,335 B2 | 10/2019 | Bretherton | |
| 10,489,395 B2 | 11/2019 | Lakkur et al. | |
| 10,685,050 B2* | 6/2020 | Krishna | G06N 3/047 |
| 10,698,906 B2 | 6/2020 | Hargreaves et al. | |
| 10,719,837 B2 | 7/2020 | Kolowich et al. | |
| 10,769,678 B2 | 9/2020 | Li | |
| 10,846,330 B2 | 11/2020 | Shilo | |
| 10,893,329 B1 | 1/2021 | Trim et al. | |
| 10,985,853 B2 | 4/2021 | Bretherton | |
| 10,986,064 B2 | 4/2021 | Siegel et al. | |
| 10,997,240 B1 | 5/2021 | Aschner et al. | |
| 11,431,660 B1 | 8/2022 | Leeds et al. | |
| 11,451,863 B1* | 9/2022 | Benjamin | H04N 21/8402 |
| 11,463,772 B1 | 10/2022 | Wanjari et al. | |
| 11,521,179 B1* | 12/2022 | Shetty | H04L 65/403 |
| 11,580,982 B1* | 2/2023 | Karnawat | G10L 15/22 |
| 11,586,344 B1 | 2/2023 | Balagurunathan et al. | |
| 2002/0042920 A1 | 4/2002 | Thomas et al. | |
| 2002/0056087 A1 | 5/2002 | Berezowski et al. | |
| 2006/0268667 A1 | 11/2006 | Jellison et al. | |
| 2007/0124756 A1 | 5/2007 | Covell et al. | |
| 2007/0271518 A1 | 11/2007 | Tischer et al. | |
| 2007/0271580 A1 | 11/2007 | Tischer et al. | |
| 2008/0086742 A1 | 4/2008 | Aldrey et al. | |
| 2009/0044217 A1 | 2/2009 | Lutterbach et al. | |
| 2009/0076917 A1 | 3/2009 | Jablokov et al. | |
| 2009/0100098 A1 | 4/2009 | Feher et al. | |
| 2009/0254934 A1 | 10/2009 | Grammens | |
| 2010/0088187 A1 | 4/2010 | Courtney et al. | |
| 2010/0280641 A1 | 11/2010 | Harkness et al. | |
| 2011/0063406 A1 | 3/2011 | Albert et al. | |
| 2011/0067044 A1 | 3/2011 | Albo | |
| 2012/0040604 A1 | 2/2012 | Amidon et al. | |
| 2012/0191774 A1 | 7/2012 | Bhaskaran et al. | |
| 2012/0304206 A1 | 11/2012 | Roberts et al. | |
| 2012/0311444 A1 | 12/2012 | Chaudhri | |
| 2012/0311618 A1 | 12/2012 | Blaxland | |
| 2012/0331168 A1 | 12/2012 | Chen | |
| 2013/0074109 A1 | 3/2013 | Skelton et al. | |
| 2013/0247081 A1 | 9/2013 | Vinson et al. | |
| 2013/0253934 A1 | 9/2013 | Parekh et al. | |
| 2014/0019225 A1 | 1/2014 | Guminy et al. | |
| 2014/0040494 A1 | 2/2014 | Deinhard et al. | |
| 2014/0068432 A1 | 3/2014 | Kucharz et al. | |
| 2014/0073236 A1 | 3/2014 | Iyer | |
| 2014/0108531 A1 | 4/2014 | Klau | |
| 2014/0123191 A1 | 5/2014 | Hahn et al. | |
| 2014/0228010 A1 | 8/2014 | Barbulescu et al. | |
| 2014/0325557 A1 | 10/2014 | Evans et al. | |
| 2014/0372179 A1 | 12/2014 | Ju et al. | |
| 2015/0163184 A1 | 6/2015 | Kanter et al. | |
| 2015/0242068 A1 | 8/2015 | Losey et al. | |
| 2015/0248798 A1* | 9/2015 | Howe | G08B 25/008 |
| | | | 340/5.83 |
| 2015/0289021 A1 | 10/2015 | Miles | |
| 2015/0319472 A1 | 11/2015 | Kotecha et al. | |
| 2015/0326922 A1 | 11/2015 | Givon et al. | |
| 2016/0027196 A1 | 1/2016 | Schiffer et al. | |
| 2016/0093289 A1 | 3/2016 | Pollet | |
| 2016/0188728 A1 | 6/2016 | Gill et al. | |
| 2016/0217488 A1 | 7/2016 | Ward et al. | |
| 2016/0266781 A1 | 9/2016 | Dandu et al. | |
| 2016/0293036 A1* | 10/2016 | Niemi | G09B 19/06 |
| 2016/0330529 A1 | 11/2016 | Byers | |
| 2017/0127136 A1 | 5/2017 | Roberts et al. | |
| 2017/0164357 A1 | 6/2017 | Fan et al. | |
| 2017/0213248 A1 | 7/2017 | Jing et al. | |
| 2017/0289617 A1 | 10/2017 | Song et al. | |
| 2017/0329466 A1 | 11/2017 | Krenkler et al. | |
| 2017/0366854 A1 | 12/2017 | Puntambekar et al. | |
| 2018/0025078 A1 | 1/2018 | Quennesson | |
| 2018/0035142 A1 | 2/2018 | Rao et al. | |
| 2018/0205797 A1 | 7/2018 | Faulkner | |
| 2018/0227632 A1 | 8/2018 | Rubin et al. | |
| 2018/0255114 A1 | 9/2018 | Dharmaji | |
| 2018/0293221 A1 | 10/2018 | Finkelstein et al. | |
| 2018/0322411 A1 | 11/2018 | Wang et al. | |
| 2018/0367229 A1 | 12/2018 | Gibson et al. | |
| 2019/0065610 A1* | 2/2019 | Singh | G06F 16/9535 |
| 2019/0132636 A1 | 5/2019 | Gupta et al. | |
| 2019/0156196 A1 | 5/2019 | Zoldi et al. | |
| 2019/0171762 A1* | 6/2019 | Luke | G06F 3/165 |
| 2019/0273570 A1 | 9/2019 | Bretherton | |
| 2019/0327103 A1 | 10/2019 | Niekrasz | |
| 2019/0385600 A1* | 12/2019 | Kim | G10L 15/20 |
| 2020/0021888 A1 | 1/2020 | Brandao et al. | |
| 2020/0160458 A1 | 5/2020 | Bodin et al. | |
| 2020/0226418 A1 | 7/2020 | Dorai-Raj et al. | |
| 2020/0279553 A1* | 9/2020 | McDUFF | G10L 25/78 |
| 2021/0090224 A1 | 3/2021 | Zhou et al. | |
| 2021/0104245 A1* | 4/2021 | Aguilar Alas | G06F 40/30 |
| 2021/0105149 A1 | 4/2021 | Roedel et al. | |
| 2021/0125054 A1 | 4/2021 | Banik et al. | |
| 2021/0160588 A1 | 5/2021 | Joseph et al. | |
| 2021/0210102 A1* | 7/2021 | Huh | G10L 17/14 |
| 2021/0217413 A1 | 7/2021 | Tushinskiy et al. | |
| 2021/0232577 A1* | 7/2021 | Ogawa | G06V 40/174 |
| 2021/0256086 A1 | 8/2021 | Askarian et al. | |
| 2021/0281925 A1 | 9/2021 | Shaikh et al. | |
| 2021/0366462 A1* | 11/2021 | Yang | G06F 40/30 |
| 2021/0407520 A1 | 12/2021 | Neckermann et al. | |
| 2022/0038783 A1 | 2/2022 | Wee | |
| 2022/0038790 A1 | 2/2022 | Duan et al. | |
| 2022/0159377 A1 | 5/2022 | Wilberding et al. | |
| 2022/0223286 A1* | 7/2022 | Lach | G16H 80/00 |
| 2022/0230632 A1 | 7/2022 | Maitra et al. | |
| 2022/0254348 A1 | 8/2022 | Tay et al. | |
| 2022/0286748 A1 | 9/2022 | Dyer et al. | |
| 2022/0369034 A1 | 11/2022 | Kumar et al. | |
| 2022/0417297 A1 | 12/2022 | Daga et al. | |
| 2023/0036192 A1 | 2/2023 | Alakoye | |
| 2023/0217195 A1 | 7/2023 | Poltorak | |

FOREIGN PATENT DOCUMENTS

| | | |
|---|---|---|
| CN | 104813305 A | 7/2015 |
| KR | 20170079496 A | 7/2017 |
| WO | 2019089028 A1 | 5/2019 |

OTHER PUBLICATIONS

Stack Overflow, "Audio mixing of Spotify tracks in IOS app," stackoverflow.com, Stack Overflow Network, Jul. 2012, available at URL: https://stackoverflow.com/questions/11396348/audio-mixing-of-spotify-tracks-in-ios-app, 2 pages.

Tengeh, R. K., & Udoakpan, N. (2021). Over-the-Top Television Services and Changes in Consumer Viewing Patterns in South Africa. Management Dynamics in the Knowledge Economy. 9(2), 257-277. DOI 10.2478/mdke-2021-0018 ISSN: 2392-8042 (online) www.managementdynamics.ro; URL: https://content.sciendo.com/view/journals/mdke/mdke-overview.xml.

Arora, S. et al., "A Practical Algorithm for Topic Modeling with Provable Guarantees," Proceedings in the 30th International Con-

(56) References Cited

OTHER PUBLICATIONS ference on Machine Learning, JMLR: W&CP vol. 28, published 2013 (Year: 2013), 9 pages.

Hoegen, Rens, et al. "An End-to-End Conversational Style Matching Agent." Proceedings of the 19th ACM International Conference on Intelligent Virtual Agents. 2019, pp. 1-8. (Year: 2019).

B. Subin, "Spotify for Android Tests New Floating Mini Player UI / Beebom," URL: https://beebom.com/spotify-tests-new-mini-player-android/, retrieved on Aug. 26, 2023, 3 pages.

Matt Ellis, "Desktop vs. mobile app design: how to optimize your user experience—99 designs," URL: https://99designs.com/blog/web-digital/desktop-vs-mobile-app-design/, retrieved Aug. 26, 2023, 12 pages.

Salesforce, "Introducing a profile page as sleek as a Tableau Public viz," https://www.tableau.com/, Tableau Software, LLC, a Salesforce Company, Jul. 21, 2021. Accessed Aug. 31, 2023. URL: https://www.tableau.com/blog/introducing-profile-page-sleek-tableau-public-viz, 7 pages.

\* cited by examiner

PROCESS AUDIO DATA RECEIVED FROM LISTENER n

EVALUATING LISTENERS WHO REQUEST TO JOIN A MEDIA PROGRAM

BACKGROUND

Today, many media programs are broadcast "live" to viewers or listeners over the air, e.g., on radio or television, or streamed or otherwise transmitted to the viewers or listeners over one or more computer networks which may include the Internet in whole or in part. Episodes of such media programs may include music, comedy, "talk" radio, interviews or any other content.

Some media programs are configured to allow listeners to join and participate in the media programs. By enabling users to provide information or express their opinions during a media program, or otherwise contribute to the media program, a creator is able to enhance the breadth of content offerings during a media program with limited effort and minimal expense.

Media programs that are presented in a call-in format are valuable and effective, but may also be subject to a number of limitations. First, producing a media program in a call-in format typically requires communications systems, services or personnel that are configured to receive requests from listeners to participate in the media program, e.g., in response to prompts from creators. Next, personnel who receive requests from the listeners must determine which of the listeners is an appropriate or best fit for the media program, or whether any of the listeners would actively contribute, in a positive way, to the media program. However, personnel who receive requests from the listeners are currently unable to determine or predict emotional states of the listeners, or to determine whether any of the listeners will ultimately share objectionable content (e.g., obscene, indecent, profane or divisive words or other content) during the media program, or otherwise disrupt the media program, until the listeners ultimately appear on the media program. Moreover, the personnel likewise cannot currently determine which of the listeners is operating a device having a suitable or appropriate connection with a control system for broadcasting the media program, or which of the listeners is operating a device having an unsuitable or inappropriate connection with the control system.

Instead, the quality of a listener's contribution to a media program may only be determined after the listener has joined the media program and begun to participate. By the time a listener is determined to be a poor fit for a media program, that may already be too late.

DETAILED DESCRIPTION

As is set forth in greater detail below, the present disclosure is directed to systems and methods for evaluating listeners who request to join episodes of media programs, for example, based on information or data received from devices or systems of the listeners. More specifically, in some implementations, a creator of a media program, or a device or system associated with the media program, may transmit information or data including a request for listeners to the media program to participate in an episode of the media program to devices of the listeners over one or more networks. In reply, the listeners may provide one or more utterances or other information to their respective devices or systems, which may transmit data representative of such utterances or information to a device or system, e.g., one or more control systems, associated with the media program.

Data received from devices or systems of listeners may be processed to evaluate each of such listeners, in order to determine whether any of the listeners is suitable or appropriate to join and participate in an episode of a media program, or to rank or rate such listeners accordingly.

For example, a control system may evaluate data received from each of the listeners for integrity, data rate or signal strength or other measures of accuracy, consistency, or reliability, and make one or more determinations regarding the suitability or appropriateness of a listener, or a device or system of the listener, accordingly. A control system may also identify profiles of listeners that provided data in response to a request, and determine whether such profiles are consistent with a theme, a topic, a genre, or any other aspect of an episode of a media program. Likewise, a control system may further evaluate data received from listeners to identify any words (or phrases or language) expressed in the data, or to identify one or more features from the data, including but not limited to features such as sentiments, opinions, or others, in order to determine whether such words or features are consistent with the theme, the topic, the genre, or any other aspect of the episode of the media program.

Based on such determinations, listeners may be rated, ranked or otherwise evaluated for suitability or appropriateness to join and participate in an episode of a media program in any manner. In some implementations, a list of such listeners, which may be rated or ranked accordingly, may be provided to a creator of the media program, and the creator may utilize the list in determining which of the listeners is a best fit to join and participate in the episode. Alternatively, a control system may automatically select or identify one or more of the listeners based on the list and permit the listener or listeners to join and participate in the media program.

Figure 1A:
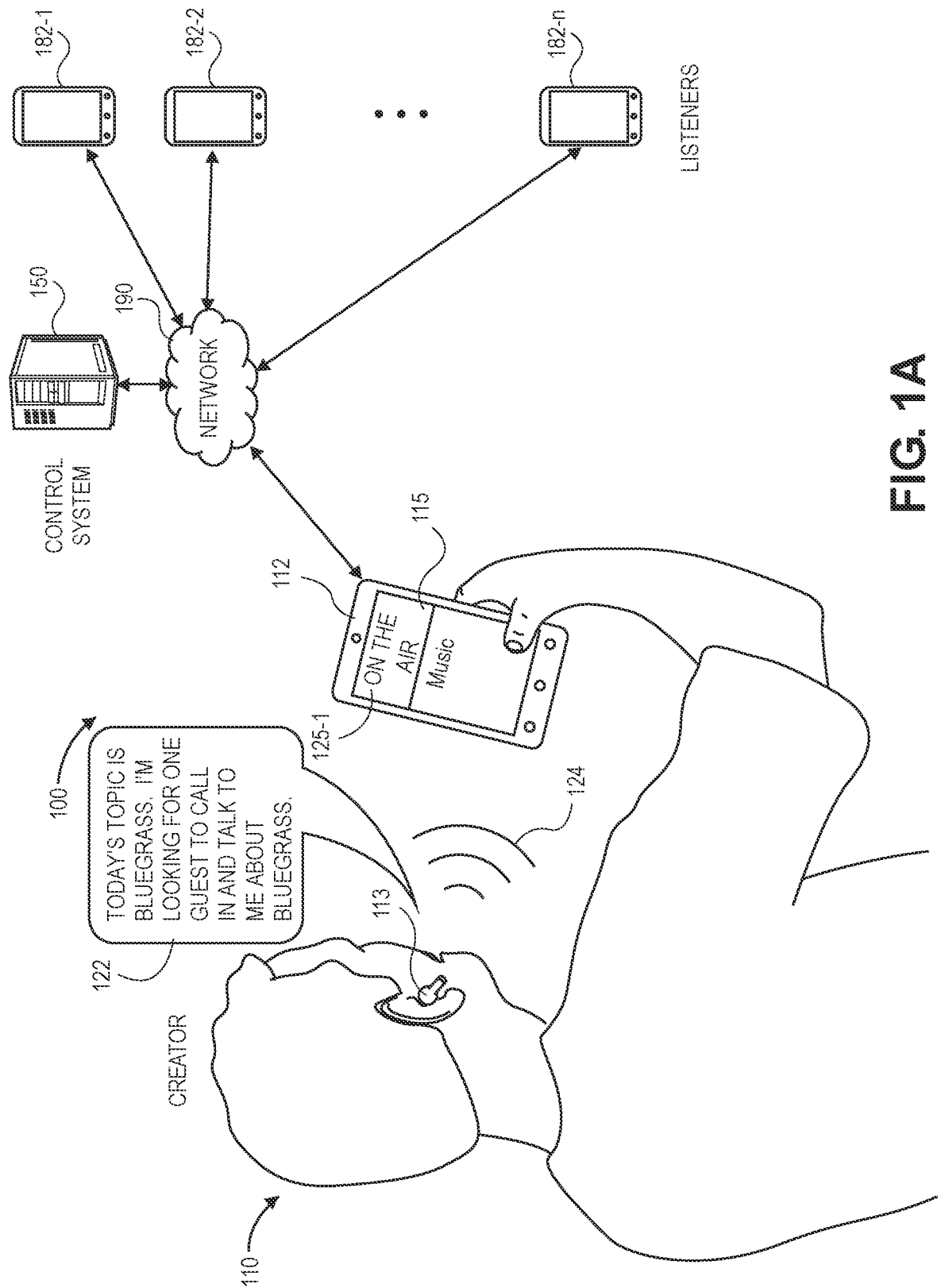
FIGS. 1A through 1H are views of aspects of one system for evaluating listeners in accordance with embodiments of the present disclosure.

Referring to FIGS. 1A through 1H, views of aspects of one system for evaluating listeners in accordance with embodiments of the present disclosure are shown. As is shown in FIG. 1A, a system 100 includes a mobile device 112 of a creator 110, a control system 150 (e.g., one or more servers or other computer systems) and a plurality of computer devices 182-1, 182-2 . . . 182-$n$ or other systems of any number n of listeners that are connected to one another over one or more networks 190, which may include the Internet in whole or in part. The creator 110 wears one or more ear buds 113 or other devices that may be in communication with the mobile device 112, and may exchange data relating to audio signals or any other data with the mobile device 112. Each of the computer devices 182-1, 182-2 . . . 182-$n$ shown in FIG. 1A is a mobile device (e.g., a tablet computer, a smartphone, or like system). Alternatively, in some implementations, the system 100 may include any number of computer devices or systems, and such devices or systems need not be limited to mobile devices.

As is shown in FIG. 1A, the mobile device 112 includes a display 115 (e.g., an interactive display or touchscreen) having a user interface 125-1 rendered thereon. As is further shown in FIG. 1A, the creator 110 provides an utterance 122 of one or more words that are intended to be heard by one or more listeners using the computer devices 182-1, 182-2 . . . 182-n. In particular, the creator 110 invites such listeners to provide him with responses including commentary, viz., "Today's topic is Bluegrass. I'm looking for one guest to call in and talk to me about Bluegrass." The mobile device 112 and/or the ear buds 113 may capture audio data 124 representing the utterance 122 of the creator 110, and transmit the data 124 to the control system 150 over the one or more networks 190. The control system 150 may then cause data, including but not limited to some or all of the audio data 124, to be transmitted to one or more computer systems or devices of listeners over one or more networks 190, viz., the computer devices 182-1, 182-2 . . . 182-n, in order to present the invitation of the creator 110 to such listeners.

Each of the computer devices 182-1, 182-2 . . . 182-n may be configured to receive information or data from one or more listeners, including but not limited to audio data representing words uttered by such listeners in response to the request of the creator 110 embodied in the utterance 122. As is shown in FIG. 1B, a representative computer device 182-i of the computer devices 182-1, 182-2 . . . 182-n renders a user interface 130 on an interactive display 185-i.

Figure 1B:
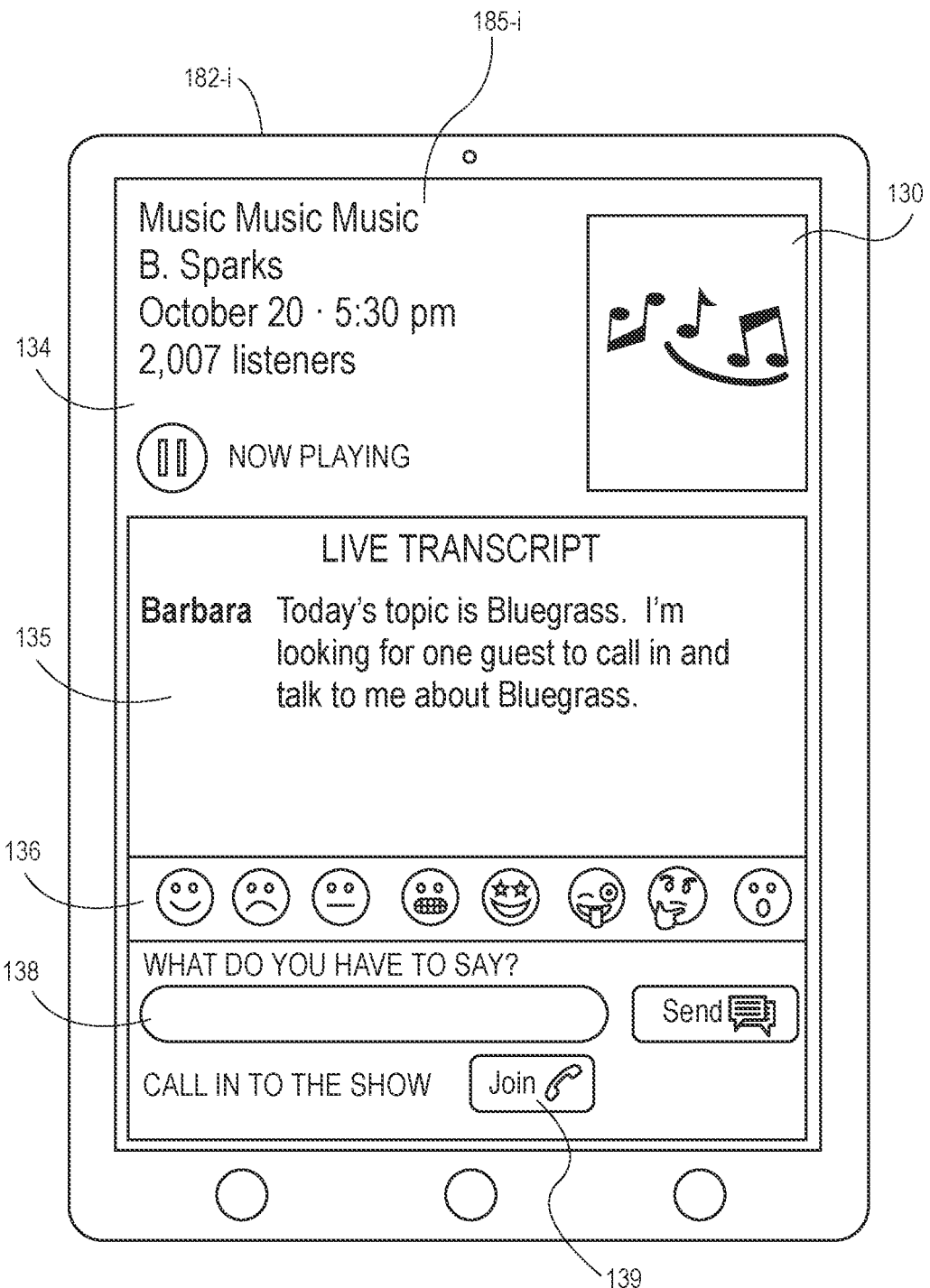

The user interface 130 of FIG. 1B includes a plurality of sections 134, 135, 136, 138, 139 rendered thereon. For example, the section 134 of the user interface 130 is provided at an upper edge or area of the display 185-i, and includes one or more identifiers or information regarding the media program, including but not limited to a title of the media program, a name of the creator 110, and a date and time on which the media program airs, as well as a number of listeners to the media program (e.g., subscribers or other guests who have requested to receive one or more episodes of the media program). In some implementations, the section 134 or any other section of the user interface 130 may include one or more elements (or features) for playing, pausing, stopping, rewinding or fast-forwarding media content of the media program. In some implementations, the section 134 or any other section of the user interface 130 may further include any other information regarding the media program or the creator.

The section 135 is provided in a substantially central area of the display 185-i below the section 134, and includes a transcript of the media program, e.g., words expressed in the utterance 122 of the creator 110 as shown in FIG. 1A. The words shown in the section 135 may be determined in real time or near-real time, e.g., by providing audio data captured by the device 112 or any of the computer devices 182-1, 182-2 . . . 182-n to one or more machine learning algorithms, systems or techniques operating on the control system 150 that may be trained to recognize and interpret any spoken words represented within the audio data, and text representing the spoken words may be transmitted to and caused to be displayed by the device 112 or any of the computer devices 182-1, 182-2 . . . 182-n. Alternatively, or additionally, the section 135 or any other section of the user interface 130 may include one or more portions for displaying other text-based information (e.g., messages) received from the creator 110 or any listeners.

The section 136 is provided between the section 135 and the section 138, and includes a plurality of interactive features for expressing an emotion or an opinion regarding a media program in general, or a portion of the media program in particular, by one or more interactions with the user interface 130. For example, as is shown in FIG. 1B, the section 136 includes a plurality of "emoji" or digital icons, images or symbols representative of emotions or opinions, which may be selected in association with the media program or any portion of the media program in order to associate the representative emotions or opinions with the media program or portion thereof.

The section 138 is provided between the section 136 and the section 139, and includes a text box or a like feature that enables a listener or any other user of the device 182-i to provide a chat message to the creator 110 or other listeners, e.g., by executing one or more gestures or other interactions with a virtual keyboard rendered on the display 185-i, and a button 138 or another selectable feature for transmitting the chat message provided within the text box to the control system 150 or the creator 110. Alternatively, a listener may provide a chat message or other information to the device 182-i for transmission to the creator 110 or the control system 150 in any other manner, e.g., by one or more voice commands or utterances, or by gestures or interactions with a drop-down menu.

The section 139 is provided at a lower edge or area of the display 185-i, and includes a button or another selectable feature for establishing a communications channel (e.g., a two-way communications channel) between the device 182-i and the control system 150 or any other system. Once the communication channel is established between the device 182-i and the control system 150 (or another system), a listener operating the device 182-i may participate in the media program, such as by providing one or more spoken utterances via the device 182-i.

The user interface 130 may be rendered by the device 182-i in any manner. For example, code for rendering the user interface 130 may be transmitted to the device 182-i by the control system 150 or from any other source, and the device 182-i may render the user interface 130 and any of the sections 134, 135, 136, 138, 139 within the user interface 130 or on the display 185-i accordingly. The code may be programmed in HTML or any other language, e.g., Java or JavaScript, and may be executed by a widget, an application programming interface (or "API"), or any other application or feature of the device 182-i. Moreover, the user interface 130 may include the features of the sections 134, 135, 136, 138, 139 in any locations on the user interface 130, and may be aligned in any orientation (e.g., portrait or landscape) with respect to the display 185-i.

Figure 1C:
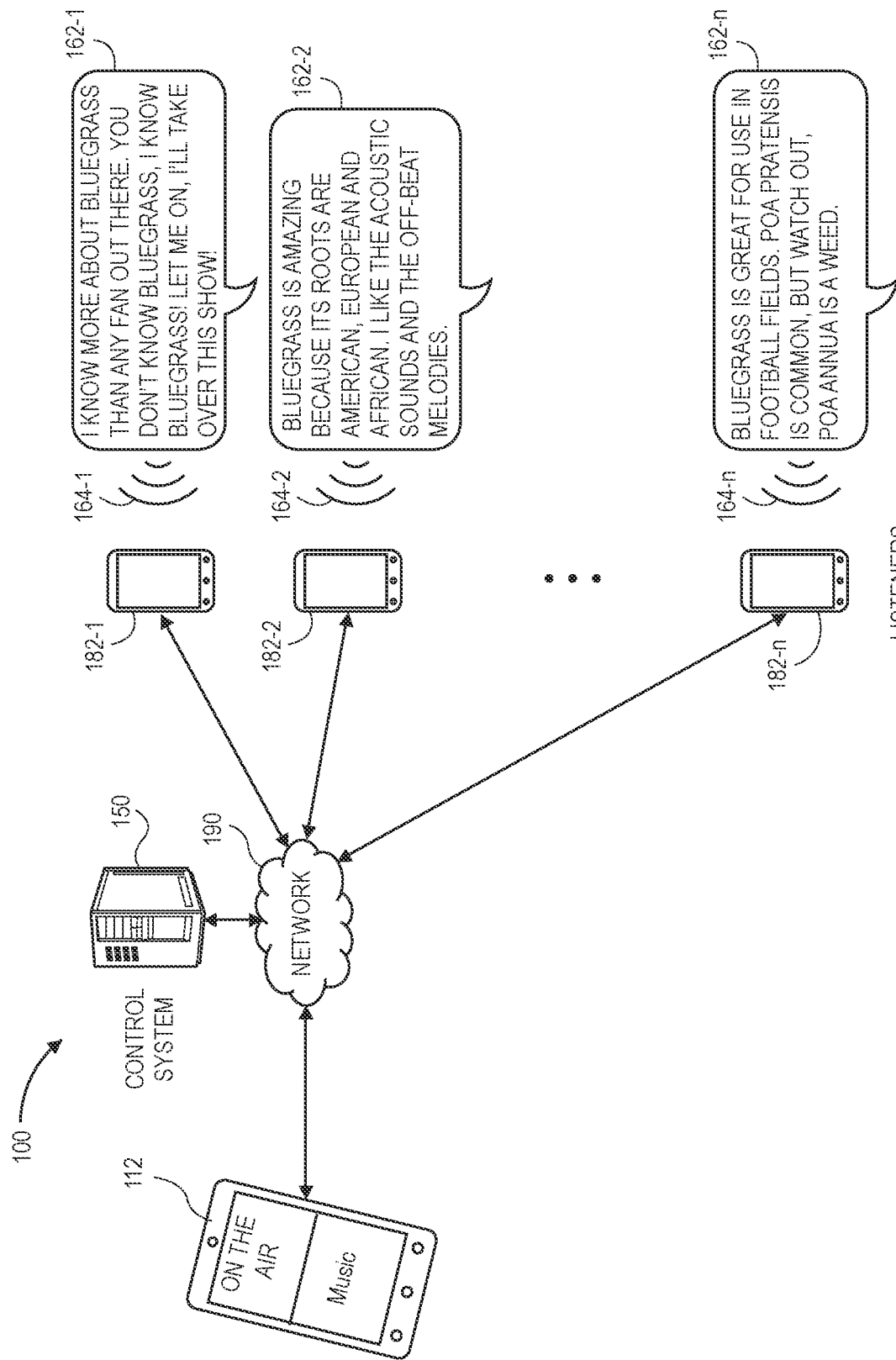

As is shown in FIG. 1C, one or more of listeners to the media program provides feedback (e.g., utterances of one or more words) 162-1, 162-2 . . . 162-n to the computer devices 182-1, 182-2 . . . 182-n, and each of the computer devices 182-1, 182-2 . . . 182-n captures audio data 164-1, 164-2 . . . 164-n representing such feedback 162-1, 162-2 . . . 162-n using one or more microphones or other sensors. For example, a listener to the device 182-1 responds with feedback (e.g., an utterance) 162-1, "I know more about Bluegrass than any fan out there. You don't know Bluegrass, I know Bluegrass! Let me on, I'll take over this show!" The device 182-1 captures the audio data 164-1 representing the feedback 162-1, and transmits the audio data 164-1 and any other metadata to the mobile device 112 or the control system 150 over the one or more networks 190. Likewise, a listener to the device 182-2 responds with feedback 162-2, "Bluegrass is amazing because its roots are American, European and African. I like the acoustic sounds and the off-beat melodies." The device 182-2 captures the audio data 164-2 representing the feedback 162-2, and transmits the audio data 164-2 and any other metadata to the mobile device 112 or the control system 150 over the one or more networks 190. A listener to the device 182-*n* responds with feedback 162-*n*, "Bluegrass is great for use in football fields. *Poa Pratensis* is common, but watch out, *Poa Annua* is a weed." The device 182-*n* captures the audio data 164-*n* representing the feedback 162-*n*, and transmits the audio data 164-*n* and any other metadata to the mobile device 112 or the control system 150 over the one or more networks 190.

Any number of the n listeners who heard the request shown in FIG. 1A may provide feedback in response to the request, or decline to provide any such feedback. The number n of listeners who subscribe to the media program, and receive audio signals from the creator 110 or the control system 150, may be several, dozens, hundreds, thousands or more of such listeners.

The audio data 164-1, 164-2 . . . 164-*n* received from each of the devices 182-1, 182-2 . . . 182-*n* may be processed by the control system 150 to identify listeners from whom the audio data 164-1, 164-2 . . . 164-*n* was received, and to determine any attributes of the audio data 164-1, 164-2 . . . 164-*n*, to identify any words expressed in the audio data 164-1, 164-2 . . . 164-*n*, or to determine features (e.g., sentiments, opinions or others) of the audio data 164-1, 164-2 . . . 164-*n*.

Figure 1D:
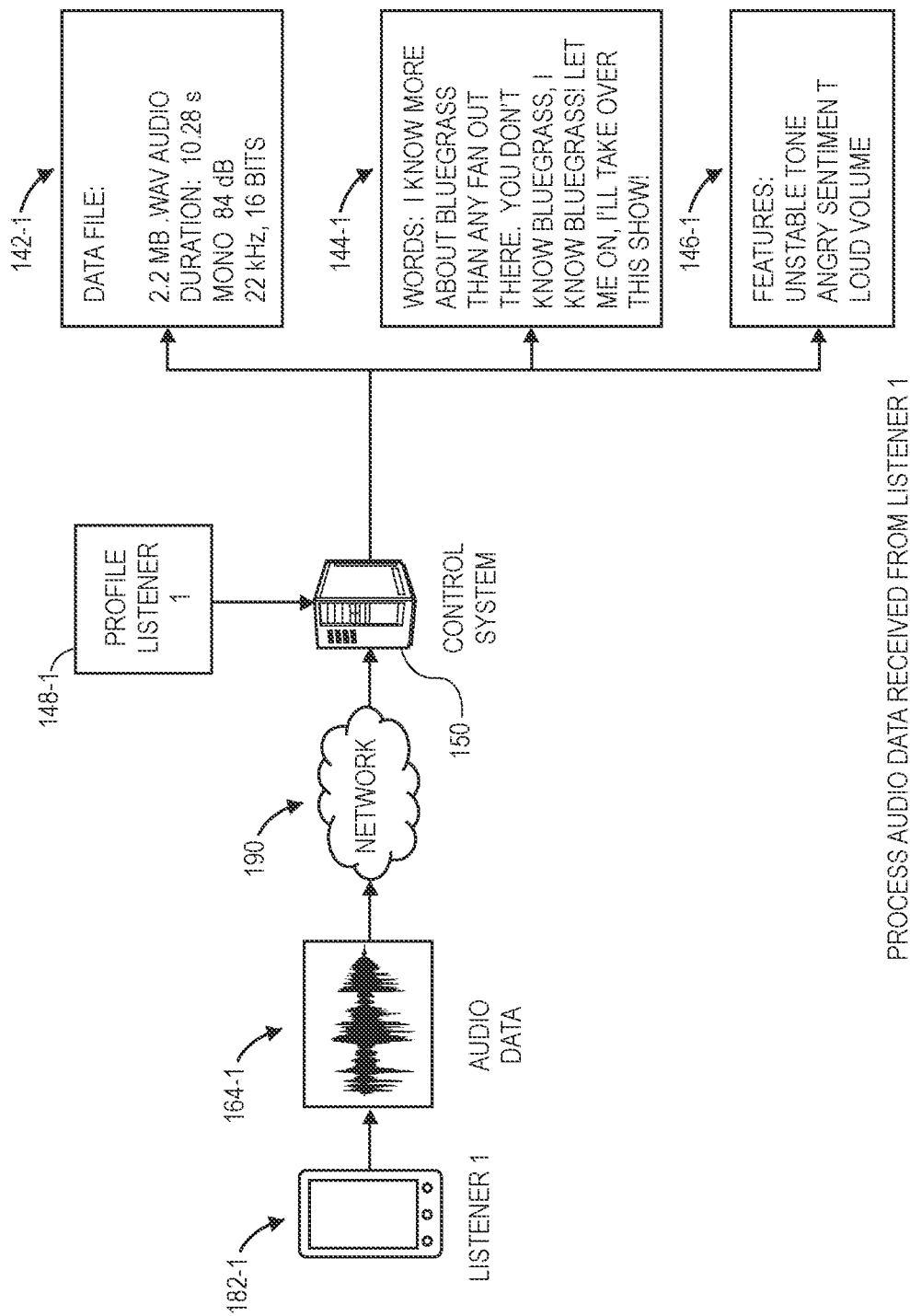

For example, as is shown in FIG. 1D, the control system 150 processes the audio data 164-1 received from the computer device 182-1 to identify attributes 142-1 of the audio data 164-1, such as a size of a file including the audio data 164-1 (viz., 2.2 megabytes), as well as a type or format of the audio data 164-1 (viz., a .WAV file), a duration of the audio data 164-1 (viz., 10.28 seconds), a number of audio channels represented in the audio data 164-1 (viz., one, or that the audio data 164-1 is monophonic), an intensity (or sound pressure level) of sounds expressed in the audio data 164-1 (viz., eighty-four decibels), a sampling rate of the audio data 164-1 (viz., twenty-two kilohertz) and a bit depth of the audio data 164-1 (viz., sixteen bits), or any other attributes.

The control system 150 further processes the audio data 164-1 to recognize any words 144-1 expressed therein, viz., the words of the feedback 162-1 shown in FIG. 1C, and to determine any features 146-1 of the audio data 164-1. For example, the audio data 164-1 and/or the words 144-1 may be processed according to one or more natural language processing ("NLP") modules, natural language understanding ("NLU") modules, or others, to recognize the features 146-1, which may include but need not be limited to sentiments, topics, attitudes, intentions, urgencies, emotions, or others expressed in the audio data 164-1. As is shown in FIG. 1D, the features 146-1 indicate that the audio data 164-1 includes or describes an unstable tone, an angry sentiment, and a loud volume.

Moreover, upon identifying a listener associated with the device 182-1, a profile 148-1 of the listener may be identified or retrieved, e.g., from one or more data stores associated with the control system 150, or with any other device or system.

Figure 1E:
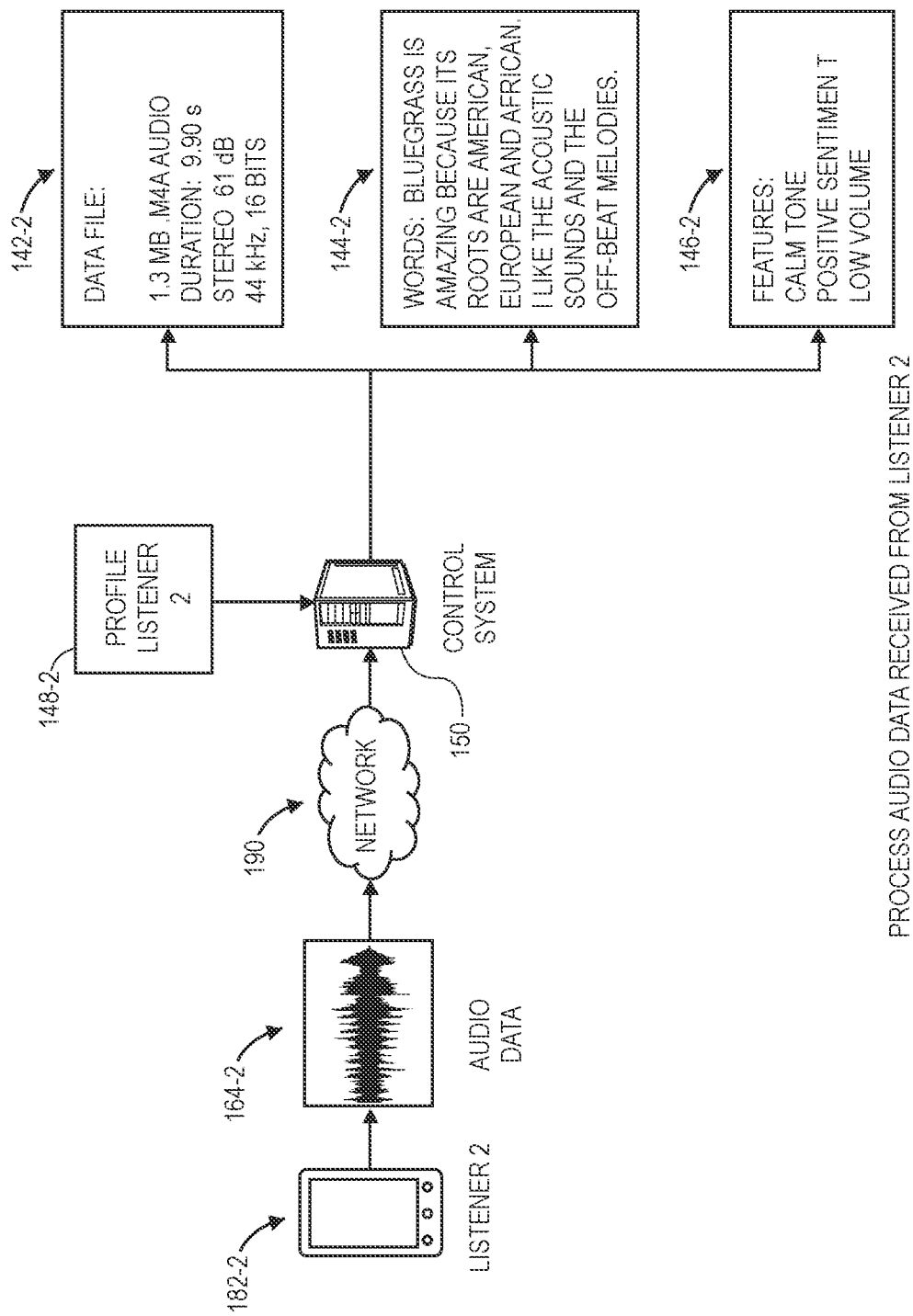

Similarly, as is shown in FIG. 1E, the control system 150 processes the audio data 164-2 received from the computer device 182-2 to identify attributes 142-2 of the audio data 164-2, such as a size of a file including the audio data 164-2 (viz., 1.3 megabytes), as well as a type or format of the audio data 164-2 (viz., an MPEG-4 or .M4A file), a duration of the audio data 164-2 (viz., 9.90 seconds), a number of audio channels represented in the audio data 164-2 (viz., two, or that the audio data 164-2 is stereophonic), an intensity (or sound pressure level) of sounds expressed in the audio data 164-2 (viz., sixty-one decibels), a sampling rate of the audio data 164-2 (viz., forty-four kilohertz) and a bit depth of the audio data 164-2 (viz., sixteen bits), or any other attributes.

The control system 150 further processes the audio data 164-2 to recognize any words 144-2 expressed therein, viz., the words of the feedback 162-2 shown in FIG. 1C, and to determine any features 146-2 of the audio data 164-2. For example, as is shown in FIG. 1E, the features 146-2 indicate that the audio data 164-2 includes or describes a calm tone, a positive sentiment, and a low volume. Additionally, upon identifying a listener associated with the device 182-2, a profile 148-2 of the listener may be identified or retrieved, e.g., from one or more data stores associated with the control system 150, or with any other device or system.

Figure 1F:
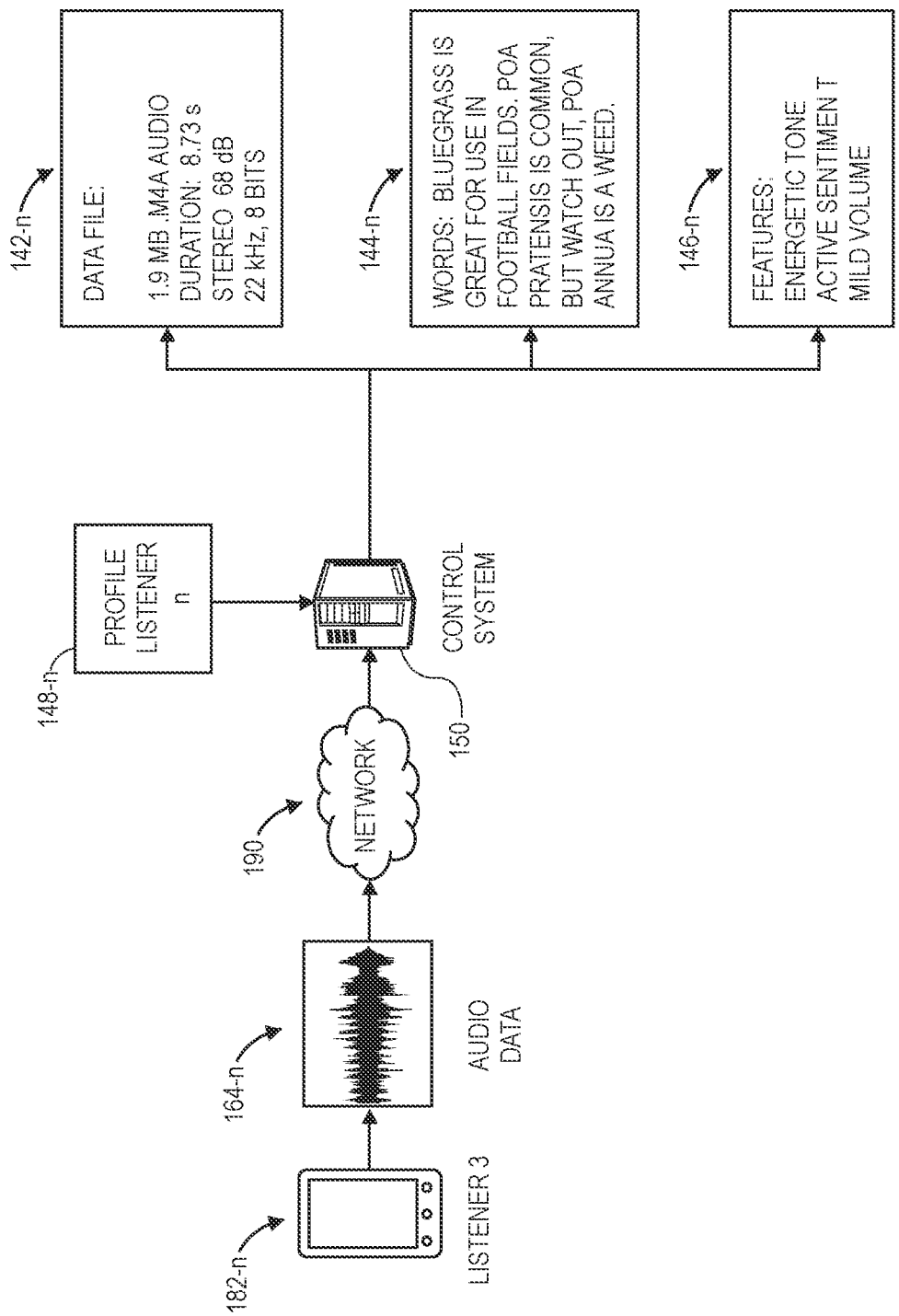

Likewise, as is shown in FIG. 1F, the control system 150 processes the audio data 164-*n* received from the computer device 182-*n* to identify attributes 142-*n* of the audio data 164-*n*, such as a size of a file including the audio data 164-*n* (viz., 1.9 megabytes), as well as a type or format of the audio data 164-*n* (viz., an .M4A file), a duration of the audio data 164-*n* (viz., 8.73 seconds), a number of audio channels represented in the audio data 164-*n* (viz., two, or that the audio data 164-*n* is stereophonic), an intensity (or sound pressure level) of sounds expressed in the audio data 164-*n* (viz., sixty-eight decibels), a sampling rate of the audio data 164-*n* (viz., 22 kilohertz) and a bit depth of the audio data 164-*n* (viz., eight bits), or any other attributes.

The control system 150 further processes the audio data 164-*n* to recognize any words 144-*n* expressed therein, viz., the words of the feedback 162-*n* shown in FIG. 1C, and to determine any features 146-*n* of the audio data 164-*n*. For example, as is shown in FIG. 1E, the features 146-*n* indicate that the audio data 164-*n* includes or describes an energetic tone, an active sentiment, and a mild volume. Additionally, upon identifying a listener associated with the device 182-*n*, a profile 148-*n* of the listener may be identified or retrieved, e.g., from one or more data stores associated with the control system 150, or with any other device or system.

Figure 1G:
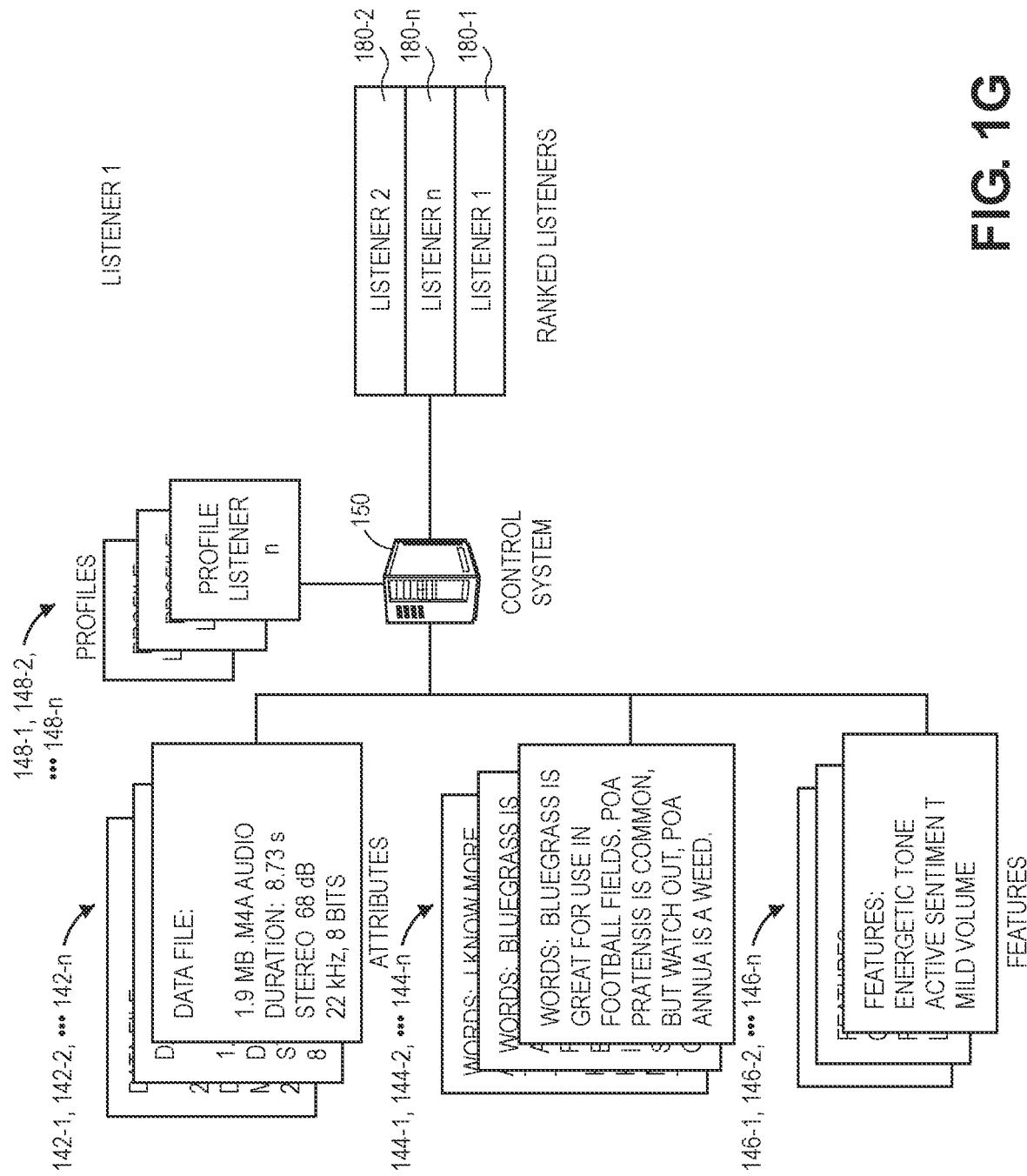

As is shown in FIG. 1G, the control system 150 may rank the listeners that provided feedback via the computer devices 182-1, 182-2 . . . 182-*n* in any manner and on any basis with respect to the attributes 142-1, 142-2 . . . 142-*n* of the audio data 164-1, 164-2 . . . 164-*n*, the words 144-1, 144-2 . . . 144-*n* identified in the audio data 164-1, 164-2 . . . 164-*n*, the features 146-1, 146-2 . . . 146-*n* expressed in the audio data 164-1, 164-2 . . . 164-*n*, or the profiles 148-1, 148-2 . . . 148-*n* of the listeners. For example, as is shown in FIG. 1G, a listener 180-2 that provided the feedback to the device 182-2, or Listener 2, is the highest ranked listener, while a listener 180-*n* that provided the feedback to the device 182-*n*, or Listener n, is the next-highest ranked listener, and a listener 180-1 that provided the feedback to the device 182-1, or Listener 1, is the lowest-ranked listener. In some implementations, the listeners may be ranked or scored according to any standard, such as according to a functional standard, e.g., based on connectivity between their respective devices 182-1, 182-2 . . . 182-*n* and the control system 150, as well an objective standard, e.g., where the listeners are ranked with respect to one another, or a subjective standard, e.g., where the listeners are ranked with respect to one or more thresholds or requirements of an episode of a media program. Alternatively, the listeners may be ranked or scored with respect to one another, or with respect to any standard, in any other manner. In some implementations, only a subset of the n listeners need be ranked with respect to one another, and fewer than all of the n listeners need be authorized to join and participate in the episode of the media program.

Figure 1H:
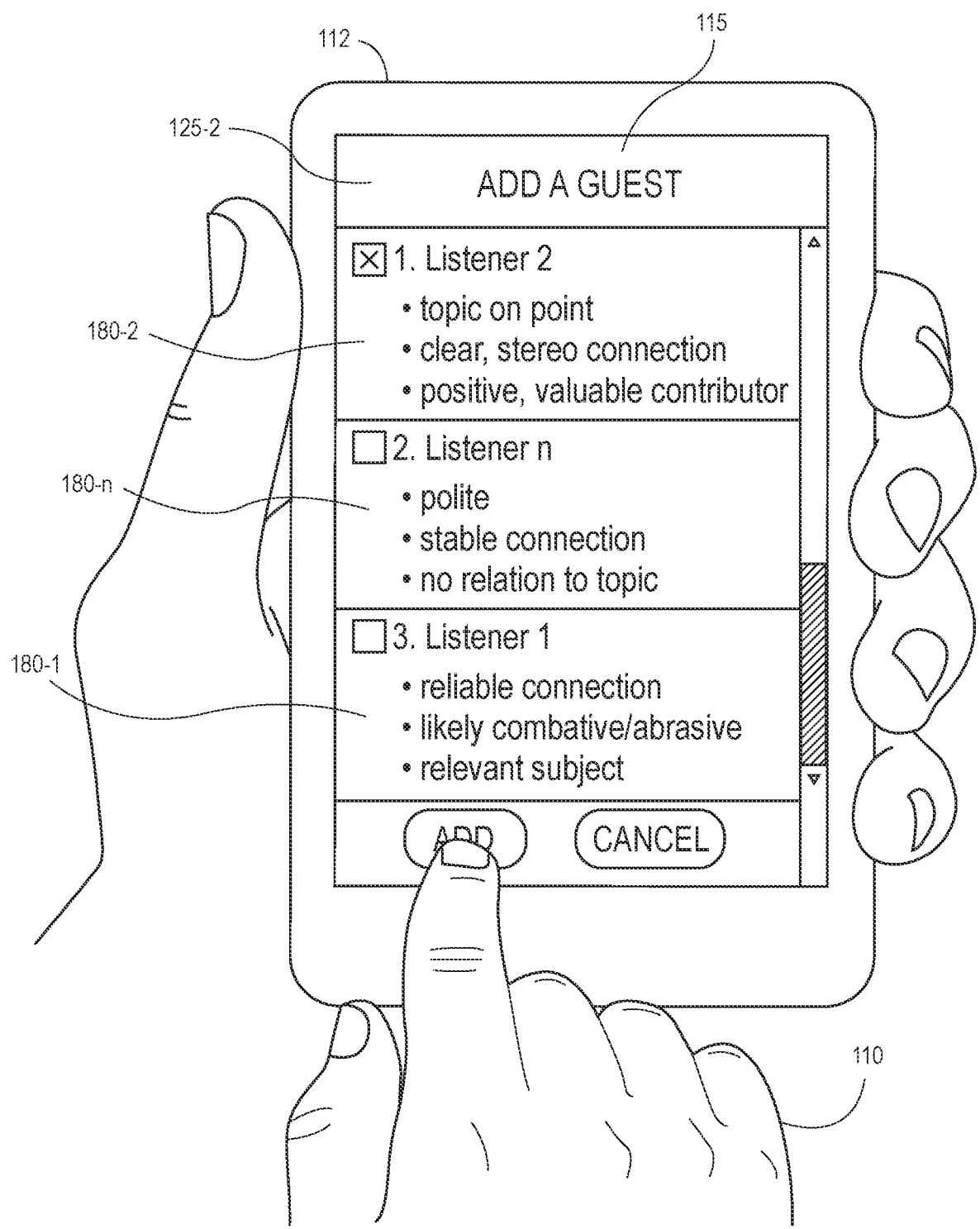

As is shown in FIG. 1H, information regarding the listeners 180-1, 180-2 . . . 180-*n* is shown in a user interface 125-2 rendered on the display 115 of the mobile device 112. The user interface 125-2 includes information regarding the listeners 180-1, 180-2 . . . 180-*n* in the ranked order, along with one or more bulleted points, notes, comments or other information regarding the respective listeners 180-1, 180-2 . . . 180-*n*. For example, as is shown in FIG. 1H, the user interface 125-2 informs the creator 110 that the listener 180-2 is ranked first (or highest) and is identified as being interested in discussing a topic that is on point with the topic of the media program, as well as a clear, stereophonic connection to the control system 150. The listener 180-2 is also characterized as potentially being a positive, valuable contributor to the media program, a determination that may be made based on the attributes 142-2 of the audio data 164-2, the words 144-2 or the features 146-2 identified from the audio data 164-2, or the profile 148-2 of the listener 180-2.

As is further shown in FIG. 1H, the user interface 125-2 informs the creator 110 that the listener 180-*n* is ranked second (or next-highest) and is identified as being polite and having a stable connection to the control system 150, e.g., via the computer device 182-*n*. However, the user interface 125-2 further informs the creator 110 that the listener 180-*n* is apparently interested in discussing a topic that bears no relation to the topic of the media program. Such determinations may be made based on the attributes 142-*n* of the audio data 164-*n*, the words 144-*n* or the features 146-*n* identified from the audio data 164-*n*, or the profile 148-*n* of the listener 180-*n*.

As is also shown in FIG. 1H, the user interface 125-2 also informs the creator 110 that the listener 180-1 is ranked third (or lowest) and is identified as having a reliable connection, and is interested in discussing a topic that is relevant to the topic of the media program, but warns the creator 110 that the listener 180-1 will likely behave in a combative or abrasive manner if the listener 180-1 is permitted to join and participate in the media program. Such determinations may be made based on the attributes 142-1 of the audio data 164-1, the words 144-1 or the features 146-1 identified from the audio data 164-1, or the profile 148-1 of the listener 180-1.

Accordingly, feedback received from listeners to a media program may be processed to identify the listeners, and to determine whether such listeners are suitable or appropriate to join and participate in the media program. The audio data may be subjected to one or more analyses to determine any attributes of the audio data, or to identify any words represented in the audio data, or audio features of the audio data. Listeners may be ranked or scored on any qualitative or quantitative basis with respect to contents of their respective profiles, as well as any attributes of the audio data, any words or any of the audio features, with weights or emphases applied as may be desired. The listeners may be ranked or scored according to any standard, such as according to a functional standard, e.g., based on connectivity between their respective devices and a control system, as well as according to an objective standard, e.g., where the listeners are ranked with respect to one another based on their respective attributes, or according to a subjective standard, e.g., by comparing the profiles, the attributes of the audio data, the words represented in the audio data or the sentiments or other features of the audio data to one or more thresholds or requirements of an episode of a media program, or thresholds or requirements established by a creator of the media program.

One or more listeners that are suitable or appropriate to join and participate in the media program may be identified and presented to a creator of the media program, or automatically joined with the media program.

A profile of a listener may include any information or data that may be known or predicted regarding the listener, including but not limited to a name of the listener, a location of the listener, media programs in which the listener is interested or media programs to which the listener has previously listened. A profile may also include any other information or data regarding the listener. For example, where the media program is associated with an electronic marketplace, the profile may include any information or data regarding items that the listener has previously purchased or contemplated purchasing.

Additionally, audio data received from a creator, a listener, a guest or another participant or source over an interval of time may be processed to detect any words represented therein, or to identify any features represented therein.

In some implementations, audio data received from listeners may be processed by one or more NLU or NLP modules, a speech recognition engine or module, or another processing module, to identify words represented in the audio data. For example, one or more computer devices or systems may transform audio data for processing by a speech recognition engine or module, which may compare the data to one or more acoustic models, language models or other data models to recognize any words incorporated in the audio data. In some implementations, data captured by a device or received from any source may be processed, e.g., by an acoustic front end, to reduce noise or divided into frames representing one or more intervals of time for which values or features representing qualities of the data, along with a vector of such values or features, may be determined, e.g., by one or more mel-frequency cepstral coefficients (or "MFCCs"), perceptual linear predictive (or "PLP") techniques, neural network feature vector techniques, linear discriminant analysis, semi-tied covariance matrices, or any other approaches known to those of skill in the art.

In some implementations, one feature of audio data received from a listener that may be identified in accordance with implementations of the present disclosure may include a sentiment of the audio data, or an opinion, an evaluation, an attitude, an appraisal, an emotion, a mood or a judgment represented within the audio data. When analyzing audio data or a portion thereof in order to identify a sentiment, an opinion or another feature expressed therein, the audio data may be bifurcated or otherwise divided into sections containing objective, fact-based statements or components, and sections containing subjective, opinion-based statements or components, the latter of which may be considered or emphasized in a sentiment analysis context. Subjective, opinion-based statements or components may further be subdivided into groups of express opinions (e.g., "I like Siberian Huskies") or opinions of a comparative nature (e.g., "I prefer the colors blue and white over the colors burgundy and gold").

Additionally, a sentiment, an opinion or another feature of audio data may be identified broadly in terms of polarity, i.e., whether the audio data is generally positive, negative or neutral, or in terms of grades or degrees. For example, audio data may be classified as "happy" or "sad," "inspirational"

or "depressing," "peaceful" or "disturbed," "angry" or "content," or with any other identifier or pair of identifiers, and to any extent or degree thereof, which may be expressed in one or more qualitative or quantitative terms. Moreover, sentiment analyses may be trained or restricted to a specific topic or category, or otherwise directed to obtaining a sentiment of a focused nature, such as a sentiment regarding the economy, sports or politics.

In order to identify and obtain a sentiment from audio data, a transcript or other set of text or any data or information included in the audio data may be analyzed in any manner. For example, one or more machine learning algorithms or techniques may be provided to determine a sentiment from a transcript of the audio data, or the audio data itself, e.g., by one or more nearest neighbor methods or analyses, artificial neural networks, factorization methods or techniques, K-means clustering analyses or techniques, similarity measures such as log likelihood similarities or cosine similarities, Bayesian classifiers, singular value decomposition methods, latent Dirichlet allocations or other topic models, linear or non-linear models, or latent semantic analyses, which may be used to review and assess the audio data, and to identify any pertinent keywords maintained therein, which may be analyzed and associated with one or more sentiments thereof.

In some implementations, one audio feature that may be identified from audio data received from a listener may include a topic (or a theme) that may be identified from a set of words included in the audio data. The topic (or theme) may be identified in any manner, e.g., by one or more topic modeling algorithms or methods such as one or more latent Dirichlet allocations, matrix factorizations, latent semantic analyses, pachinko allocation models, transformers (e.g., a bidirectional encoder representation from transformers) or others. In some implementations, a topic (or a theme) may be identified by counting words (including any known synonyms) appearing within a set of words, or defining groups of the words that best represent the set. In some implementations, a topic (or a theme) may be identified based on an extent to which words are repeated within the set of words, or a frequency with which such words appear, as well as how such words are used within individual chat messages or the set of words as a whole. A topic (or a theme) may also be identified by comparing and contrasting different portions of a set of words, e.g., portions spoken by different speakers (e.g., creators, listeners or other participants), or based on text not actually included within the set of words. A topic (or a theme) may also be identified based on any metaphors or analogies included within a set of words as a whole, as well as based on any transitions or connections between any portions of the set of words. Additionally, in some implementations, a topic (or a theme) may be identified or designated by a creator, a listener or another individual.

In a live broadcasting environment, such as where content generated by creators is transmitted to any number of listeners over one or more networks, a creator is often granted broad discretion to generate or select content of nearly any type, at any time, and for any duration. Many creators invite guests, such as listeners to an episode of a media program, or others to join and participate in the episode of the media program by providing media content in the form of spoken or sung words, or in any other manner. A creator's selections of guests may, therefore, have a direct influence on a number of listeners that listen to media programs, and on how long such listeners remain engaged with the media programs.

As used herein, the term "media entity" may refer to media content of any type or form (e.g., audio and/or video) that may be recorded, stored, maintained or transmitted in one or more files, such as a movie, podcast, a song (or title), a television show, or any other audio and/or video programs. The term "media entity" may also refer to a descriptor of media content, e.g., an era, a genre, or a mood, or any other descriptor of one or more audio and/or video programs. The term "media entity" may further include a file including information, data or metadata regarding one or more sets of media content, or a physical or virtual representation of the one or more sets of media content, such as an album, a playlist, a soundtrack, or any other information, data, metadata, or representations. The term "media entity" may also include one or more persons or entities associated with such media content, e.g., an artist, a group, a label, a producer, a service, a station, or any other persons or entities.

Media content that may be included in a media program includes, but need not be limited to, one or more media entities retrieved from a music catalog, repository or streaming service, one or more advertisements of items, goods or services, or one or more news, sports or weather programs, which may be generated live or previously recorded. Media content that may be included in a media program also includes audio data representing words that are spoken or sung by a creator or one or more guests, such as musicians, celebrities, personalities, athletes, politicians, or artists, or any listeners to the media program. A control system, or any associated conference systems, broadcast systems or mixing systems, may establish or terminate connections with a creator, with any sources of media content, or with any number of listeners, to compile and efficiently transmit media content of a media program over digital channels (e.g., web-based or application-based), to any number of systems or devices of any form.

One or more of the embodiments disclosed herein may overcome limitations of existing systems and methods for presenting media programs or other content, e.g., radio programs, to listeners. Unbounded by traditional frequency bands or broadcast protocols, the systems and methods of the present disclosure may receive designations of media content from a creator of a media program, e.g., in a broadcast plan, and the media program may be transmitted over one or more networks to any number of listeners in any locations and by way of any devices. Creators of media programs may designate one or more types or files of media content to be broadcast to listeners via a user interface rendered on a display or by any type or form of computer device, in accordance with a broadcast plan or other schedule. A control system, or a mixing system, a conference system or a broadcast system, may retrieve the designated media content from any number of sources, or initiate or control the designated media content to any number of listeners, by opening one or more connections between computer devices or systems of the creator and computer devices or systems of the sources or listeners.

In some implementations of the present disclosure, one-way communication channels, or unidirectional channels, may be established between a broadcast system (or a control system) and any number of other computer devices or systems. For example, broadcast channels may be established between a broadcast system (or a control system) and sources of media or other content, or between a broadcast system (or a control system) and devices of any number of listeners, for providing media content. Two-way communication channels, or bidirectional channels, may also be established between a conference system (or a control system) and any number of other computer devices or systems. For example, a conference channel may be established between a computer device or system of a creator or another source of media and a conference system (or a control system). Furthermore, one-way or two-way communication channels may be established between a conference system and a mixing system, or between a mixing system and a broadcast system, as appropriate.

Communication channels may be established in any manner, in accordance with implementations of the present disclosure. Those of ordinary skill in the pertinent arts will recognize that computer networks, such as the Internet, may operate based on a series of protocols that are layered on top of one another. Such protocols may be collectively referred to as an Internet Protocol suite (or IP suite). One underlying layer of the IP suite is sometimes referred to in the abstract as a link layer, e.g., physical infrastructure, or wired or wireless connections between one or more networked computers or hosts. A second layer atop the link layer is a network layer, which is sometimes called an Internet Protocol layer, and is a means by which data is routed and delivered between two disparate physical locations.

A third layer in an IP suite is a transport layer, which may be analogized to a recipient's mailbox. The transport layer may divide a host's network interface into one or more channels, or ports, with each host having as many ports available for establishing simultaneous network connections. A socket is a combination of an IP address describing a host for which data is intended and a port number indicating a channel on the host to which data is directed. A socket is used by applications running on a host to listen for incoming data and send outgoing data. One standard transport layer protocol is the Transmission Control Protocol, or TCP, which is full-duplex, such that connected hosts can concurrently send and receive data. A fourth and uppermost layer in the IP suite is referred to as an application layer. Within the application layer, familiar protocols such as Hypertext Transfer Protocol (or "HTTP"), are found. HTTP is built on a request/response model in which a client sends a request to a server, which may be listening for such requests, and the server parses the request and issues an appropriate response, which may contain a network resource.

One application-layer protocol for communicating between servers and clients is called Web Socket, which provides TCP-like functionality at the application layer. Like TCP, WebSocket is full-duplex, such that once an underlying connection is established, a server may, of its own volition, push data to client devices with which the server is connected, and clients may continue to send messages to the server over the same channel. Additionally, a pure server-push technology is also built into HTML5, one version of Hypertext Markup Language. This technology, which is known as Server-Sent Events (or SSE), operates over standard HTTP, and is a novel use of an existing application-layer protocol. Server-Sent Events works by essentially sending partial responses to an initial HTTP request, such that a connection remains open, enabling further data to be sent at a later time. In view of its unidirectional nature, Server-Sent Events is useful in situations in which a server will be generating a steady stream of updates without requiring anything further from a client.

Communications channels of the present disclosure may be associated with any type of content and established computer devices and systems associated with any type of entity, and in accordance with a broadcast plan or sequence of media content, or at the control or discretion of one or more creators. One or more user interfaces rendered by or on a computer system or device may permit a creator to control the synchronization or mixing of media content by the broadcast system or the mixing system. Gestures or other interactions with the user interfaces may be translated into commands to be processed by the broadcast system or the mixing system, e.g., to play a specific media entity, to insert a specific advertisement, or to take any other relevant actions, such as to adjust a volume or another attribute or parameter of media content. Moreover, a broadcast system or the mixing system may provide any relevant information to a creator via such user interfaces, including information regarding attributes or parameters of media content that was previously played, that is being played, or that is scheduled to be played in accordance with a broadcast plan or during a media program. The broadcast system or the mixing system may further execute one or more instructions in response to rules, which may define or control media content that is to be played at select times during a media program, e.g., to automatically increase or decrease volumes or other attributes or parameters of a voice of a creator, or of other media content from other sources, on any basis. Any rules governing the playing of media content of a media program by the broadcast system or the mixing system may be overridden by a creator, e.g., by one or more gestures or other interactions with a user interface of an application in communication with the broadcast system or the mixing system that may be associated with the playing of the media content or the media program.

Figure 2A:
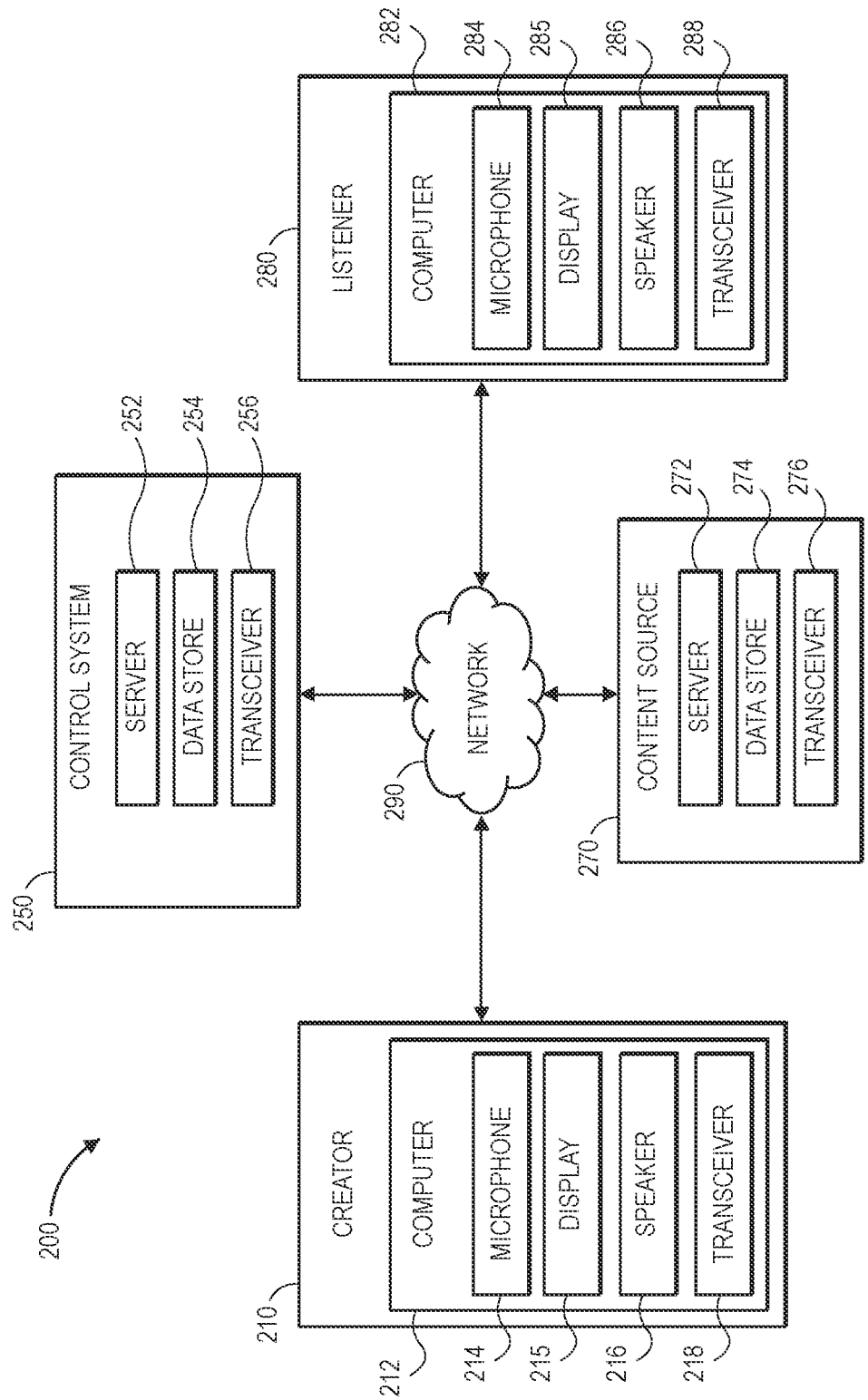
FIGS. 2A and 2B are block diagrams of components of one system for evaluating listeners in accordance with embodiments of the present disclosure.
Figure 2B:
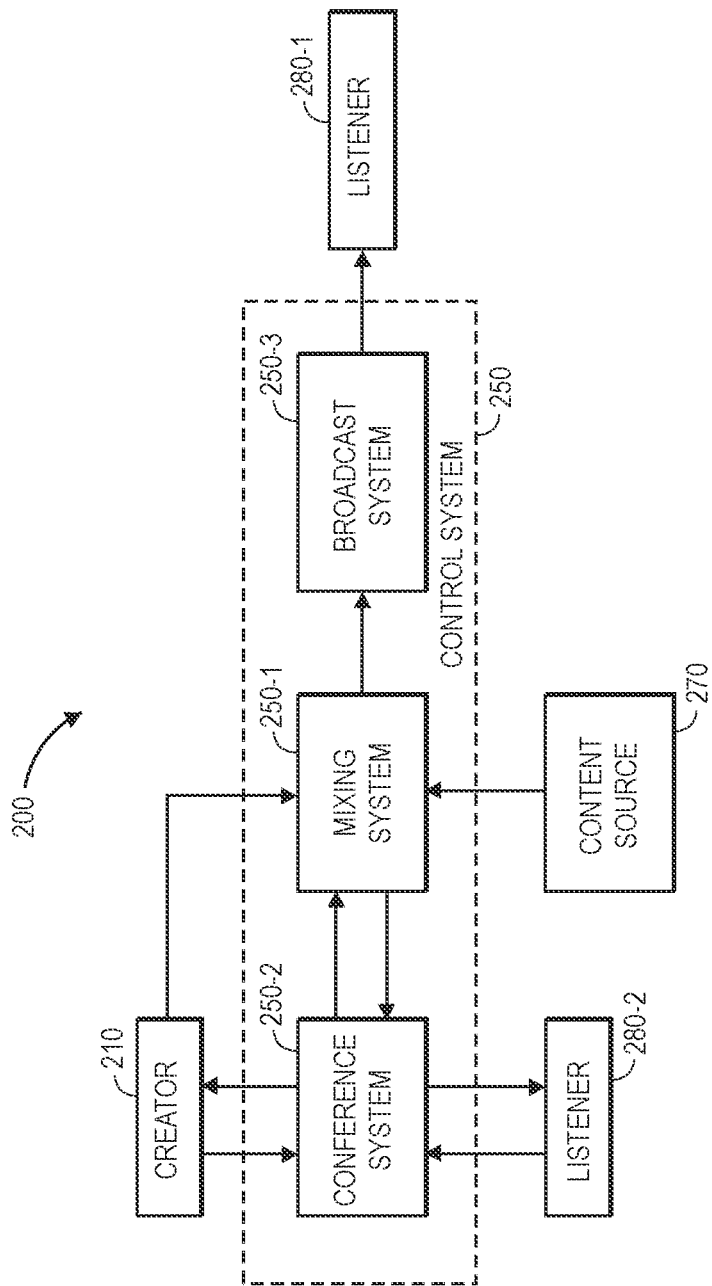

Referring to FIGS. 2A and 2B, block diagrams of components of one system 200 for evaluating listeners in accordance with embodiments of the present disclosure is shown. Except where otherwise noted, reference numerals preceded by the number "2" shown in FIG. 2A or FIG. 2B indicate components or features that are similar to components or features having reference numerals preceded by the number "1" shown in FIGS. 1A through 1H.

As is shown in FIG. 2A, the system 200 shown in FIG. 2A includes a creator 210, a control system 250, a content source 270, and a listener 280 that are connected to one another over one or more networks 290.

The creator 210 may be any individual or entity that expresses an interest or an intent in constructing a media program including media content, and providing the media program to the listener 280 over the network 290. As is shown in FIG. 2A, the creator 210 is associated with or operates a computer system 212 having a microphone 214, a display 215, a speaker 216 and a transceiver 218, and any other components.

In some implementations, the computer system 212 may be a mobile device, such as a smartphone, a tablet computer, a wristwatch, or others. In some other implementations, the computer system 212 may be a laptop computer or a desktop computer, or any other type or form of computer. In still other implementations, the computer system 212 may be, or may be a part of, a smart speaker, a television, an automobile, a media player, or any other type or form of system having one or more processors, memory or storage components (e.g., databases or other data stores), or other components.

The microphone 214 may be any sensor or system for capturing acoustic energy, including but not limited to piezoelectric sensors, vibration sensors, or other transducers for detecting acoustic energy, and for converting the acoustic energy into electrical energy or one or more electrical signals. The display 215 may be a television system, a monitor or any other like machine having a screen for viewing rendered video content, and may incorporate any number of active or passive display technologies or systems, including but not limited to electronic ink, liquid crystal displays (or "LCD"), light-emitting diode (or "LED") or organic light-emitting diode (or "OLED") displays, cathode ray tubes (or "CRT"), plasma displays, electrophoretic displays, image projectors, or other display mechanisms including but not limited to micro-electromechanical systems (or "MEMS"), spatial light modulators, electroluminescent displays, quantum dot displays, liquid crystal on silicon (or "LCOS") displays, cholesteric displays, interferometric displays or others. The display 215 may be configured to receive content from any number of sources via one or more wired or wireless connections, e.g., the control system 250, the content source 270 or the listener 280, over the networks 290.

In some implementations, the display 215 may be an interactive touchscreen that may not only display information or data but also receive interactions with the information or data by contact with a viewing surface. For example, the display 215 may be a capacitive touchscreen that operates by detecting bioelectricity from a user, or a resistive touchscreen including a touch-sensitive computer display composed of multiple flexible sheets that are coated with a resistive material and separated by an air gap, such that when a user contacts a surface of a resistive touchscreen, at least two flexible sheets are placed in contact with one another.

The speaker 216 may be any physical components that are configured to convert electrical signals into acoustic energy such as electrodynamic speakers, electrostatic speakers, flat-diaphragm speakers, magnetostatic speakers, magnetostrictive speakers, ribbon-driven speakers, planar speakers, plasma arc speakers, or any other sound or vibration emitters.

The transceiver 218 may be configured to enable the computer system 212 to communicate through one or more wired or wireless means, e.g., wired technologies such as Universal Serial Bus (or "USB") or fiber optic cable, or standard wireless protocols such as Bluetooth® or any Wireless Fidelity (or "Wi-Fi") protocol, such as over the network 290 or directly. The transceiver 218 may further include or be in communication with one or more input/output (or "I/O") interfaces, network interfaces and/or input/output devices, and may be configured to allow information or data to be exchanged between one or more of the components of the computer system 212, or to one or more other computer devices or systems (e.g., other aerial vehicles, not shown) via the network 290. The transceiver 218 may perform any necessary protocol, timing or other data transformations in order to convert data signals from a first format suitable for use by one component into a second format suitable for use by another component. In some embodiments, the transceiver 218 may include support for devices attached through various types of peripheral buses, e.g., variants of the Peripheral Component Interconnect (PCI) bus standard or the Universal Serial Bus (USB) standard. In some other embodiments, functions of the transceiver 218 may be split into two or more separate components.

In some implementations, the computer system 212 may include a common frame or housing that accommodates the microphone 214, the display 215, the speaker 216 and/or the transceiver 218. In some implementations, applications or functions or features described as being associated with the computer system 212 may be performed by a single system. In some other implementations, however, such applications, functions or features may be split among multiple systems. For example, an auxiliary system, such as the ear buds 113 of FIG. 1A, may perform one or more of such applications or functions, or include one or more features, of the computer system 212 or other computer systems or devices described herein, and may exchange any information or data that may be associated with such applications, functions or features with the computer system 212, as necessary. Alternatively, or additionally, the computer system 212 may include one or more power supplies, sensors (e.g., visual cameras or depth cameras), feedback devices (e.g., haptic feedback systems), chips, electrodes, clocks, boards, timers or other relevant features (not shown).

In some implementations, the computer system 212 may be programmed or configured to render one or more user interfaces on the display 215 or in any other manner, e.g., by a browser or another application. The computer system 212 may receive one or more gestures or other interactions with such user interfaces, and such gestures or other interactions may be interpreted to generate one or more instructions or commands that may be provided to one or more of the control system 250, the content source 270 or the listener 280. Alternatively, or additionally, the computer system 212 may be configured to present one or more messages or information to the creator 210 in any other manner, e.g., by voice, and to receive one or more instructions or commands from the creator 210, e.g., by voice.

The control system 250 may be any single system, or two or more of such systems, that is configured to establish or terminate channels or connections with or between the creator 210, the content source 270 or the listener 280, to initiate a media program, or to control the receipt and transmission of media content from one or more of the creator 210, the content source 270 or the listener 280 to the creator 210, the content source 270 or the listener 280. The control system 250 may operate or include a networked computer infrastructure, including one or more physical computer servers 252 and data stores 254 (e.g., databases) and one or more transceivers 256, that may be associated with the receipt or transmission of media or other information or data over the network 290. The control system 250 may also be provided in connection with one or more physical or virtual services configured to manage or monitor such files, as well as one or more other functions. The servers 252 may be connected to or otherwise communicate with the data stores 254 and may include one or more processors. The data stores 254 may store any type of information or data, including media files or any like files containing multimedia (e.g., audio and/or video content), for any purpose. The servers 252 and/or the data stores 254 may also connect to or otherwise communicate with the networks 290, through the sending and receiving of digital data.

In some implementations, the control system 250 may be independently provided for the exclusive purpose of managing the monitoring and distribution of media content. Alternatively, the control system 250 may be operated in connection with one or more physical or virtual services configured to manage the monitoring or distribution of media files, as well as one or more other functions. Additionally, the control system 250 may include any type or form of systems or components for receiving media files and associated information, data or metadata, e.g., over the networks 290. For example, the control system 250 may receive one or more media files via any wired or wireless means and store such media files in the one or more data stores 254 for subsequent processing, analysis and distribution. In some embodiments, the control system 250 may process and/or analyze media files, such as to add or assign metadata, e.g., one or more tags, to media files.

The control system 250 may further broadcast, air, stream or otherwise distribute media files maintained in the data stores 254 to one or more listeners, such as the listener 280 or the creator 210, over the networks 290. Accordingly, in addition to the server 252, the data stores 254, and the transceivers 256, the control system 250 may also include any number of components associated with the broadcasting, airing, streaming or distribution of media files, including but not limited to transmitters, receivers, antennas, cabling, satellites, or communications systems of any type or form. Processes for broadcasting, airing, streaming and distribution of media files over various networks are well known to those skilled in the art of communications and thus, need not be described in more detail herein.

The content source 270 may be a source, repository, bank, or other facility for receiving, storing or distributing media content, e.g., in response to one or more instructions or commands from the control system 250. The content source 270 may receive, store or distribute media content of any type or form, including but not limited to advertisements, music, news, sports, weather, or other programming. The content source 270 may include, but need not be limited to, one or more servers 272, data stores 274 or transceivers 276, which may have any of the same attributes or features of the servers 252, data stores 254 or transceivers 256, or one or more different attributes or features.

In some embodiments, the content source 270 may be an Internet-based streaming content and/or media service provider that is configured to distribute media over the network 290 to one or more general purpose computers or computers that are dedicated to a specific purpose.

For example, in some embodiments, the content source 270 may be associated with a television channel, network or provider of any type or form that is configured to transmit media files over the airwaves, via wired cable television systems, by satellite, over the Internet, or in any other manner. The content source 270 may be configured to generate or transmit media content live, e.g., as the media content is captured in real time or in near-real time, such as following a brief or predetermined lag or delay, or in a pre-recorded format, such as where the media content is captured or stored prior to its transmission to one or more other systems. For example, the content source 270 may include or otherwise have access to any number of microphones, cameras or other systems for capturing audio, video or other media content or signals. In some embodiments, the content source 270 may also be configured to broadcast or stream one or more media files for free or for a one-time or recurring fees. In some embodiments, the content source 270 may be associated with any type or form of network site (e.g., a web site), including but not limited to news sites, sports sites, cultural sites, social networks or other sites, that streams one or more media files over a network. In essence, the content source 270 may be any individual or entity that makes media files of any type or form available to any other individuals or entities over one or more networks 290.

The listener 280 may be any individual or entity having access to one or more computer devices 282, e.g., general purpose or special purpose devices, who has requested (e.g., subscribed to) media content associated with one or more media programs over the network 290. For example, the computer devices 282 may be at least a portion of an automobile, a desktop computer, a laptop computer, a media player, a smartphone, a smart speaker, a tablet computer, a television, or a wristwatch, or any other like machine that may operate or access one or more software applications, and may be configured to receive media content, and present the media content to the listener 280 by one or more speakers, displays or other feedback devices. The computer device 282 may include a microphone 284, a display 285, a speaker 286, a transceiver 288, or any other components described herein, which may have any of the same attributes or features of the computer device 212, the microphone 214, the display 215, the speaker 216 or the transceiver 218 described herein, or one or more different attributes or features. In accordance with the present disclosure, a listener 280 that requests to receive media content associated with one or more media programs may also be referred to as a "subscriber" to such media programs or media content.

Those of ordinary skill in the pertinent arts will recognize that the computer devices 212, 282 may include any number of hardware components or operate any number of software applications for playing media content received from the control system 250 and/or the media sources 270, or from any other systems or devices (not shown) connected to the network 290.

Moreover, those of ordinary skill in the pertinent arts will further recognize that, alternatively, in some implementations, the computer device 282 need not be associated with a specific listener 280. For example, the computer device 282 may be provided in a public place, beyond the control of the listener 280, e.g., in a bar, a restaurant, a transit station, a shopping center, or elsewhere, where any individuals may receive one or more media programs.

The networks 290 may be or include any wired network, wireless network, or combination thereof, and may comprise the Internet, intranets, broadcast networks, cellular television networks, cellular telephone networks, satellite networks, or any other networks, for exchanging information or data between and among the computer systems or devices of the creator 210, the control system 250, the media source 270 or the listener 280, or others (not shown). In addition, the network 290 may be or include a personal area network, local area network, wide area network, cable network, satellite network, cellular telephone network, or combination thereof, in whole or in part. The network 290 may also be or include a publicly accessible network of linked networks, possibly operated by various distinct parties, such as the Internet. The network 290 may include one or more wireless networks, such as a Global System for Mobile Communications (GSM) network, a Code Division Multiple Access (CDMA) network, a Long-Term Evolution (LTE) network, or some other type of wireless network. Protocols and components for communicating via the Internet or any of the other aforementioned types of communication networks are well known to those skilled in the art of computer communications and thus, need not be described in more detail herein.

Although the system 200 shown in FIG. 2A shows boxes for one creator 210, one control system 250, one media source 270, one listener 280, and one network 290, those of ordinary skill in the pertinent arts will recognize that any number of creators 210, broadcast systems 250, media sources 270, listeners 280 or networks 290 may be utilized to transmit, receive, access, hear, or view media content provided in accordance with implementations of the present disclosure. Moreover, the computer devices 212, 252, 272, 282 may include all or fewer of the components shown in FIG. 2A or perform all or fewer of the tasks or functions described herein. Tasks or functions described as being executed or performed by a single system or device associated with the creator 210, the control system 250, the media source 270 or the listener 280 may be executed or performed by multiple systems or devices associated with each of the creator 210, the control system 250, the media source 270 or the listener 280. For example, the tasks or functions described herein as being executed or performed by the control system 250 may be performed by a single system, or by separate systems for establishing two-way connections with the creator 210 or any number of media sources 270, or any other systems, e.g., a mixing system, or for establishing one-way connections with any number of media sources 270 or any number of listeners 280 and transmitting data representing media content, e.g., a broadcast system, from such media sources 270 to such listeners 280. Moreover, two or more creators 210 may collaborate on the construction of a media program.

In some implementations, one or more of the tasks or functions described as being executed or performed by the control system 250 may be performed by multiple systems. For example, as is shown in FIG. 2B, the system 200 may include a mixing system 250-1, a conference system 250-2 and a broadcast system 250-3 that may perform one or more of the tasks or functions described herein as being executed or performed by the control system 250.

As is further shown in FIG. 2B, the mixing system 250-1 may be configured to receive data from the conference system 250-2, as well as from one or more content sources 270. For example, in some implementations, the conference system 250-2 may also be configured to establish two-way communications channels with computer devices or systems associated with the creator 210 (or any number of creators) as well as a listener 280-2 (or any number of listeners) or other authorized host, guests, or contributors to a media program associated with one or more of the creators 210, and form a "conference" including each of such devices or systems. The conference system 250-2 may receive data representing media content such as audio signals in the form of words spoken or sung by one or more of the creator 210, the listener 280-2, or other entities connected to the conference system 250-2, or music or other media content played by the one or more of the creator 210, the listener 280-2, or such other entities, and transmit data representing the media content or audio signals to each of the other devices or systems connected to the conference system 250-2.

In some implementations, the mixing system 250-1 may also be configured to establish a two-way communications channel with the conference system 250-2, thereby enabling the mixing system 250-1 to receive data representing audio signals from the conference system 250-2, or transmit data representing audio signals to the conference system 250-2. For example, in some implementations, the mixing system 250-1 may act as a virtual participant in a conference including the creator 210 and any listeners 280-2, and may receive data representing audio signals associated with any participants in the conference, or provide data representing audio signals associated with media content of the media program, e.g., media content received from any of the content sources 270, to such participants.

The mixing system 250-1 may also be configured to establish a one-way communications channel with the content source 270 (or with any number of content sources), thereby enabling the mixing system 250-1 to receive data representing audio signals corresponding to advertisements, songs or media files, news programs, sports programs, weather reports or any other media files, which may be live or previously recorded, from the content source 270. The mixing system 250-1 may be further configured to establish a one-way communications channel with the broadcast system 250-3, and to transmit data representing media content received from the creator 210 or the listener 280-2 by way of the conference channel 250-2, or from any content sources 270, to the broadcast system 250-3 for transmission to any number of listeners 280-1.

The mixing system 250-1 may be further configured to receive information or data from one or more devices or systems associated with the creator 210, e.g., one or more instructions for operating the mixing system 250-1. For example, in some implementations, the mixing system 250-1 may be configured to cause any number of connections to be established between devices or systems and one or more of the conference system 250-2 or the broadcast system 250-3, or for causing data representing media content of any type or form to be transmitted to one or more of such devices or systems in response to such instructions. In some implementations, the mixing system 250-1 may also be configured to initiate or modify the playing of media content, such as by playing, pausing or stopping the media content, advancing (e.g., "fast-forwarding") or rewinding the media content, increasing or decreasing levels of volume of the media content, or setting or adjusting any other attributes or parameters (e.g., treble, bass, or others) of the media content, in response to such instructions or automatically.

The broadcast system 250-3 may be configured to establish one-way communications channels with any number of listeners 280-1, and to transmit data representing media content received from the mixing system 250-1 to each of such listeners 280-1.

The computers, servers, devices and the like described herein have the necessary electronics, software, memory, storage, databases, firmware, logic/state machines, microprocessors, communication links, displays or other visual or audio user interfaces, printing devices, and any other input/output interfaces to provide any of the functions or services described herein and/or achieve the results described herein. Also, those of ordinary skill in the pertinent art will recognize that users of such computers, servers, devices and the like may operate a keyboard, keypad, mouse, stylus, touch screen, or other device (not shown) or method to interact with the computers, servers, devices and the like, or to "select" an item, link, node, hub or any other aspect of the present disclosure.

The computer devices 212, 282 or the servers 252, 272, and any associated components, may use any web-enabled or Internet applications or features, or any other client-server applications or features including E-mail or other messaging techniques, to connect to the networks 290, or to communicate with one another, such as through short or multimedia messaging service (SMS or MMS) text messages. For example, the computer devices 212, 282 or the servers 252, 272 may be configured to transmit information or data in the form of synchronous or asynchronous messages to one another in real time or in near-real time, or in one or more offline processes, via the networks 290. Those of ordinary skill in the pertinent art would recognize that the creator 210, the control system 250 (or the mixing system 250-1, the conference system 250-2, or the broadcast system 250-3), the media source 270 or the listener 280 (or the listeners 280-1, 280-2) may include or operate any of a number of computing devices that are capable of communicating over the networks 290. The protocols and components for providing communication between such devices are well known to those skilled in the art of computer communications and need not be described in more detail herein.

The data and/or computer executable instructions, programs, firmware, software and the like (also referred to herein as "computer executable" components) described herein may be stored on a computer-readable medium that is within or accessible by computers or computer components such as computer devices 212, 282 or the servers 252, 272, or to any other computers or control systems utilized by the creator 210, the control system 250 (or the mixing system 250-1, the conference system 250-2, or the broadcast system 250-3), the media source 270 or the listener 280 (or the listeners 280-1, 280-2), and having sequences of instructions which, when executed by a processor (e.g., a central processing unit, or "CPU"), cause the processor to perform all or a portion of the functions, services and/or methods described herein. Such computer executable instructions, programs, software and the like may be loaded into the memory of one or more computers using a drive mechanism associated with the computer readable medium, such as a floppy drive, CD-ROM drive, DVD-ROM drive, network interface, or the like, or via external connections.

Some embodiments of the systems and methods of the present disclosure may also be provided as a computer-executable program product including a non-transitory machine-readable storage medium having stored thereon instructions (in compressed or uncompressed form) that may be used to program a computer (or other electronic device) to perform processes or methods described herein. The machine-readable storage media of the present disclosure may include, but is not limited to, hard drives, floppy diskettes, optical disks, CD-ROMs, DVDs, ROMs, RAMs, erasable programmable ROMs ("EPROM"), electrically erasable programmable ROMs ("EEPROM"), flash memory, magnetic or optical cards, solid-state memory devices, or other types of media/machine-readable medium that may be suitable for storing electronic instructions. Further, embodiments may also be provided as a computer executable program product that includes a transitory machine-readable signal (in compressed or uncompressed form). Examples of machine-readable signals, whether modulated using a carrier or not, may include, but are not limited to, signals that a computer system or machine hosting or running a computer program can be configured to access, or including signals that may be downloaded through the Internet or other networks, e.g., the network 290.

Figure 3:
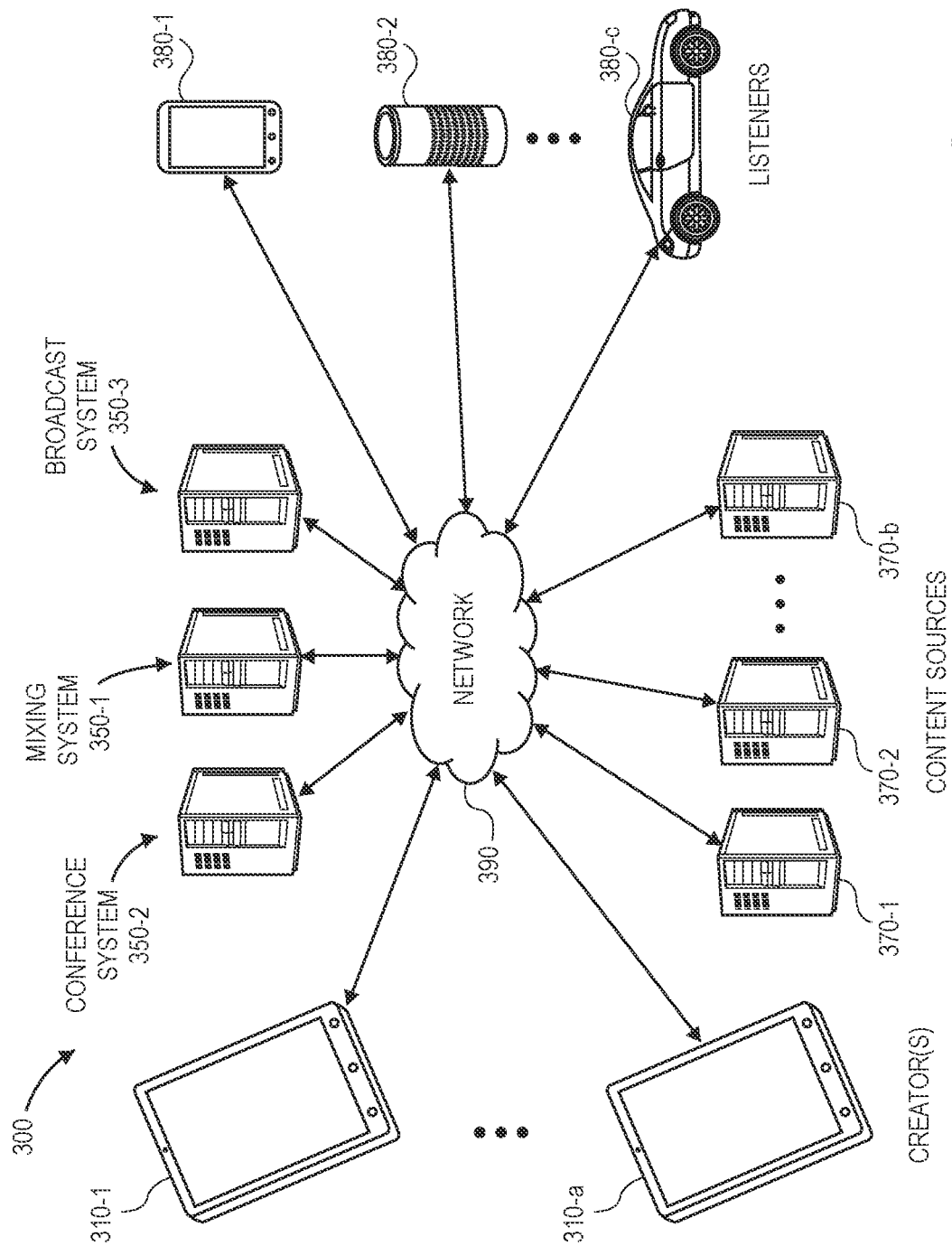
FIG. 3 is a view of aspects of one system for evaluating listeners in accordance with embodiments of the present disclosure.

Referring to FIG. 3, a view of aspects of one system for evaluating listeners in accordance with embodiments of the present disclosure is shown. Except where otherwise noted, reference numerals preceded by the number "3" shown in FIG. 3 indicate components or features that are similar to components or features having reference numerals preceded by the number "2" shown in FIG. 2A or FIG. 2B or by the number "1" shown in FIGS. 1A through 1H. As is shown in FIG. 3, the system 300 includes computer systems or devices of a plurality of creators 310-1 . . . 310-a, a mixing system 350-1, a conference system 350-2, a broadcast system 350-3, a plurality of content sources 370-1, 370-2 . . . 370-b and a plurality of listeners 380-1, 380-2 . . . 380-c that are connected to one another over a network 390, which may include the Internet in whole or in part.

The creators 310-1 . . . 310-a may operate a computer system or device having one or more microphones, an interactive display, one or more speakers, one or more processors and one or more transceivers configured to enable communication with one or more other computer systems or devices. In some implementations, the creators 310-1 . . . 310-a may operate a smartphone, a tablet computer or another mobile device, and may execute interactions with one or more user interfaces rendered thereon, e.g., by a mouse, a stylus, a touchscreen, a keyboard, a trackball, or a trackpad, as well as any voice-controlled devices or software (e.g., a personal assistant). Interactions with the user interfaces may be interpreted and transmitted in the form of instructions or commands to the mixing system 350-1, the conference system 350-2 or the broadcast system 350-3. Alternatively, the creators 310-1 . . . 310-a may operate any other computer system or device, e.g., a laptop computer, a desktop computer, a smart speaker, a media player, a wristwatch, a television, an automobile, or any other type or form of system having one or more processors, memory or storage components (e.g., databases or other data stores), or other components.

Additionally, the mixing system 350-1 may be any server or other computer system or device configured to receive information or data from the creators 310-1 . . . 310-a, or any of the listeners 380-1, 380-2 . . . 380-c, e.g., by way of the conference system 350-2, or from any of the media sources 370-1, 370-2 . . . 370-b over the network 390. The mixing system 350-1 may be further configured to transmit any information or data to the broadcast system 350-3 over the network 390, and to cause the broadcast system 350-3 to transmit any of the information or data to any of the listeners 380-1, 380-2 . . . 380-c, in accordance with a broadcast plan (or a sequence of media content, or another schedule), or at the direction of the creators 310-1 . . . 310-a. The mixing system 350-1 may also transmit or receive information or data along such communication channels, or in any other manner. The operation of the mixing system 350-1, e.g., the establishment of connections, or the transmission and receipt of data via such connections, may be subject to the control or discretion of any of the creators 310-1 . . . 310-a.

In some implementations, the mixing system 350-1 may receive media content from one or more of the media sources 370-1, 370-2 . . . 370-b, and cause the media content to be transmitted to one or more of the creators 310-1 . . . 310-a or the listeners 380-1, 380-2 . . . 380-c by the broadcast system 350-3. In some other implementations, the mixing system 350-1 may receive media content from one or more of the media sources 370-1, 370-2 . . . 370-b, and mix, or combine, the media content with any media content received from the creators 310-1 . . . 310-a or any of the listeners 380-1, 380-2 . . . 380-c, before causing the media content to be transmitted to one or more of the creators 310-1 . . . 310-a or the listeners 380-1, 380-2 . . . 380-c by the conference system 350-2 or the broadcast system 350-3. For example, in some implementations, the mixing system 350-1 may receive media content (e.g., audio content and/or video content) captured live by one or more sensors of one or more of the media sources 370-1, 370-2 . . . 370-b, e.g., cameras and/or microphones provided at a location of a sporting event, or any other event, and mix that media content with any media content received from any of the creators 310-1 . . . 310-a or any of the listeners 380-1, 380-2 . . . 380-c. In such embodiments, the creators 310-1 . . . 310-a may act as sportscasters, news anchors, weathermen, reporters or others, and may generate a media program that combines audio or video content captured from a sporting event or other event of interest, along with audio or video content received from one or more of the creators 310-1 . . . 310-a or any of the listeners 380-1, 380-2 . . . 380-c before causing the media program to be transmitted to the listeners 380-1, 380-2 . . . 380-c by the conference system 350-2 or the broadcast system 350-3.

In some implementations, the conference system 350-2 may establish two-way communications channels between any of the creators 310-1 . . . 310-*a* and, alternatively, any of the listeners 380-1, 380-2 . . . 380-*c*, who may be invited or authorized to participate in a media program, e.g., by providing media content in the form of spoken or sung words, music, or any media content, subject to the control or discretion of the creators 310-1 . . . 310-*a*. Devices or systems connected to the conference system 350-2 may form a "conference" by transmitting or receiving information or data along such communication channels, or in any other manner. The operation of the mixing system 350-1, e.g., the establishment of connections, or the transmission and receipt of data via such connections, may be subject to the control or discretion of the creators 310-1 . . . 310-*a*. In some implementations, the mixing system 350-1 may effectively act as a virtual participant in such a conference, by transmitting media content received from any of the media sources 370-1, 370-2 . . . 370-*b* to the conference system 350-2 for transmission to any devices or systems connected thereto, and by receiving media content from any of such devices or systems by way of the conference system 350-2 and transmitting the media content to the broadcast system 350-3 for transmission to any of the listeners 380-1, 380-2 . . . 380-*c*.

Likewise, the broadcast system 350-3 may be any server or other computer system or device configured to receive information or data from the mixing system 350-1, or transmit any information or data to any of the listeners 380-1, 380-2 . . . 380-*c* over the network 390. In some implementations, the broadcast system 350-3 may establish one-way communications channels with the mixing system 350-1 or any of the listeners 380-1, 380-2 . . . 380-*c* in accordance with a broadcast plan (or a sequence of media content, or another schedule), or at the direction of the creators 310-1 . . . 310-*a*. The broadcast system 350-3 may also transmit or receive information or data along such communication channels, or in any other manner. The operation of the broadcast system 350-3, e.g., the establishment of connections, or the transmission of data via such connections, may be subject to the control or discretion of the creators 310-1 . . . 310-*a*.

The content sources 370-1, 370-2 . . . 370-*b* may be servers or other computer systems having media content stored thereon, or access to media content, that are configured to transmit media content to the creators 310-1 . . . 310-*a* or any of the listeners 380-1, 380-2 . . . 380-*c* in response to one or more instructions or commands from the creators 310-1 . . . 310-*a* or the mixing system 350-1. The media content stored on or accessible to the content sources 370-1, 370-2 . . . 370-*b* may include one or more advertisements, songs or media files, news programs, sports programs, weather reports or any other media files, which may be live or previously recorded. The number of content sources 370-1, 370-2 . . . 370-*b* that may be accessed by the mixing system 350-1, or the types of media content stored thereon or accessible thereto, is not limited.

The listeners 380-1, 380-2 . . . 380-*c* may also operate any type or form of computer system or device configured to receive and present media content, e.g., at least a portion of an automobile, a desktop computer, a laptop computer, a media player, a smartphone, a smart speaker, a tablet computer, a television, or a wristwatch, or others.

The mixing system 350-1, the conference system 350-2 or the broadcast system 350-3 may establish or terminate connections with the creators 310-1 . . . 310-*a*, with any of the content sources 370-1, 370-2 . . . 370-*b*, or with any of the listeners 380-1, 380-2 . . . 380-*c*, as necessary, to compile and seamlessly transmit media programs over digital channels (e.g., web-based or application-based), to devices of the creators 310-1 . . . 310-*a* or the listeners 380-1, 380-2 . . . 380-*c* in accordance with a broadcast plan, or subject to the control of the creators 310-1 . . . 310-*a*. Furthermore, in some implementations, one or more of the listeners 380-1, 380-2 . . . 380-*c*, e.g., musicians, celebrities, personalities, athletes, politicians, or artists, may also be content sources. For example, where the broadcast system 350-3 has established one-way channels, e.g., broadcast channels, with any of the listeners 380-1, 380-2 . . . 380-*c*, the mixing system 350-1 may terminate one of the one-way channels with one of the listeners 380-1, 380-2 . . . 380-*c*, and cause the conference system 350-2 to establish a two-directional channel with that listener, thereby enabling that listener to not only receive but also transmit media content to the creators 310-1 . . . 310-*a* or any of the other listeners.

Those of ordinary skill in the pertinent arts will recognize that any of the tasks or functions described above with respect to the mixing system 350-1, the conference system 350-2 or the broadcast system 350-3 may be performed by a single device or system, e.g., a control system, or by any number of devices or systems.

Figure 4:
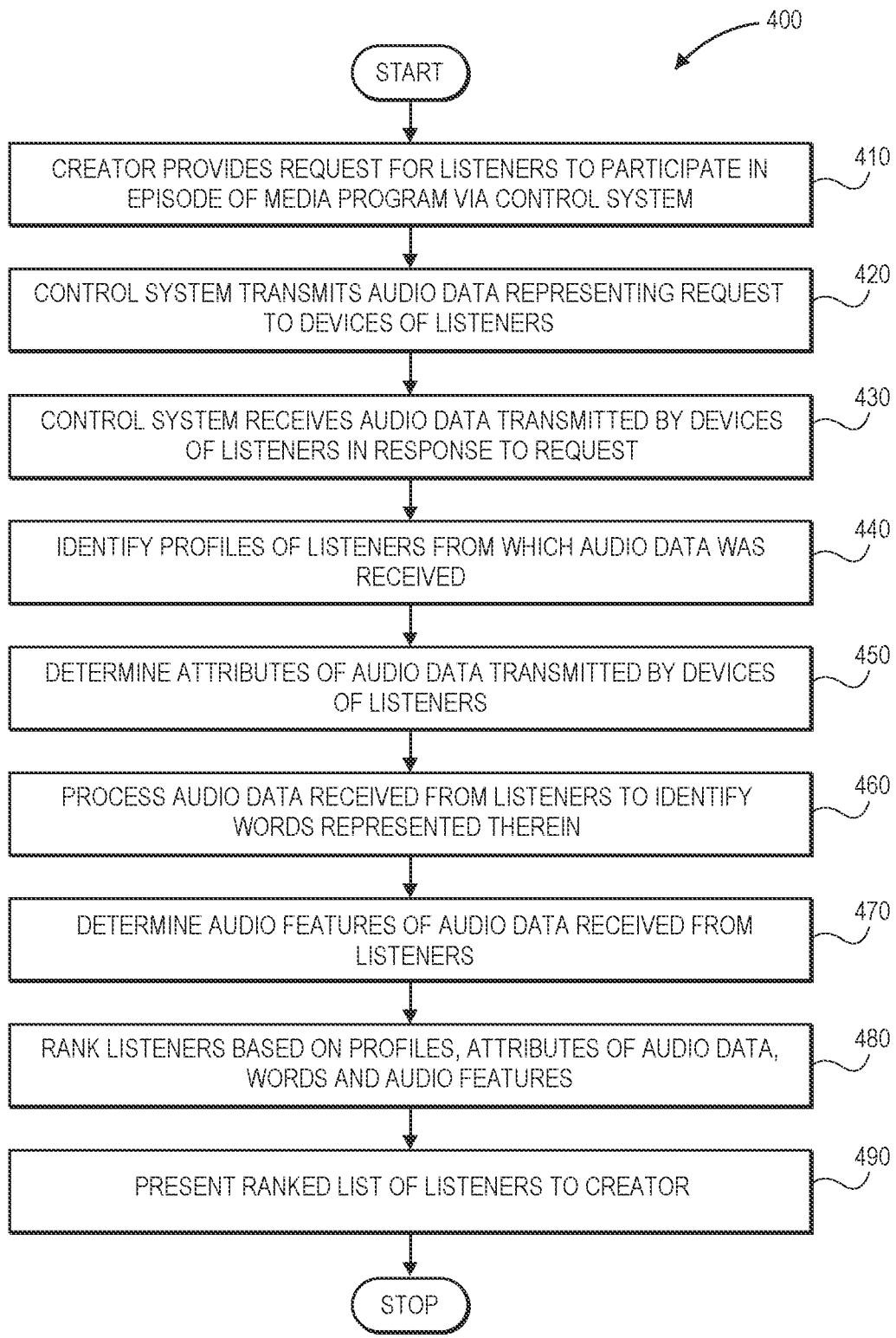
FIG. 4 is a flow chart of one process for evaluating listeners in accordance with embodiments of the present disclosure.

Referring to FIG. 4, a flow chart 400 of one process for evaluating listeners in accordance with embodiments of the present disclosure is shown.

At box 410, a creator provides a request for listeners to participate in an episode of a media program via a control system. The creator may provide the request at any time with respect to the airing of the episode to listeners, and in any manner. For example, in some implementations, the creator may provide the request during the media program, e.g., audibly, by one or more utterances that may be captured or received by sensors of a mobile device or another system of the creator. The control system or another device or system may receive audio data representing the utterances from the device of the creator, e.g., via a two-way communication channel, and transmit some or all of the audio data to devices or systems of listeners, e.g., via one-way communication channels with each of such devices or systems, or in any other manner. Furthermore, the creator may provide the request during the episode, or prior to a start of the episode.

In some implementations, the creator may provide the request in a text-based format, e.g., by one or more electronic messages, such as by one or more electronic messages to an application, client or other program for operating or controlling the media program, or by electronic mail, text messages (e.g., SMS or MMS messages), social media messages, network pages (e.g., web pages), or the like, to another application, client or program operating on the devices of the listeners. Moreover, in some implementations, the request may be automatically generated, e.g., by a control system, based on a topic, a theme, a genre, or another attribute of the episode.

At box 420, the control system transmits audio data representing the request to devices of the listeners. In some implementations, the control system may transmit the audio data representing the request to the devices of the listeners via one-way communication channels, e.g., as a part of the episode, or at any other time. Alternatively, the audio data, or a link to the audio data, may be provided to the devices of the listeners prior to the episode, or during the episode, in any other manner or by any other communication channels, e.g., a separate communications channel, independent of a communications channel by which media content is transmitted or received in accordance with the media program. In some implementations, the request may be transmitted to the devices of the listeners in a form other than audio data, such as by one or more electronic messages to such devices.

At box 430, the control system receives audio data from the devices of the listeners in response to the request. For example, in some implementations, the listeners may provide one or more audible utterances or other information or data, which may be captured or received by one or more sensors of the devices of the listeners. Such devices may transmit audio data representing the utterances or other information or data to the control system over the one or more networks, e.g., via a two-way communication channel associated with the episode or independently via one or more other channels.

At box 440, profiles of the listeners from whom audio data was received at box 430 are identified, e.g., in one or more data stores. The profiles may include any available information or data regarding the respective listeners, such as names, ages, genders, identities, preferences for media content, other media programs to which such listeners subscribe, or any other information or data. Where the media program or the control system responsible for transmitting content of the media program is associated with an electronic marketplace, however, the profiles may include any information or data regarding a customer's purchasing history at the electronic marketplace, including but not limited to identifiers of items previously purchased by the customer, as well as identifiers of items in which the customer is believed to be interested.

At box 450, attributes of the audio data transmitted by the devices of the listeners are determined. For example, the attributes may include or relate to measures of the transmission quality of the audio data received from each of the devices of the listeners, or the service reliability of connections between the control system and each of the devices of the listeners during the transmission of the audio data, as well as any measures relating to bandwidth occupied during the transmission of the audio data, or degradation of the audio data due to delays, distortions, echoes, frequency response errors, gain compression, noise, or any other aspects of the transmission of the audio data.

At box 460, the audio data received from the listeners at box 430 is processed to identify one or more words represented therein. The words represented in the audio data may be identified or transcribed in any manner, e.g., in real time or in near-real time, by automated speech recognition or any other techniques, to identify the one or more words represented therein. Alternatively, the words identified from the audio signals may have been spoken or sung, or otherwise generated in any other manner. In some implementations, portions of the audio data representing or corresponding to speech may be separated from portions of the audio data not representing or corresponding to speech, before processing the portions representing or corresponding to speech to identify words represented therein.

At box 470, one or more audio features are determined from the audio data received from the listeners at box 430. For example, such audio features may include, but need not be limited to, sentiments or opinions expressed in the audio data, as well as any topics, attitudes, intentions, urgencies, emotions or other features. In some implementations, the audio features may include, but need not be limited to one or more values, variables, vectors or other sets of data corresponding to or representative of emotions, tones, sentiments or other attributes in the audio data. In some implementations, the audio features may be identified by one or more extraction techniques, such as spectrogram, chromogram, mel-frequency cepstral coefficients, linear prediction cepstral coefficients, short-time energy, or others.

At box 480, the plurality of listeners from whom the audio data was received at box 430 are ranked based on the profiles, the attributes of the audio data, the words, or the audio features. In some implementations, each of the listeners may be ranked or scored on any qualitative or quantitative basis with respect to contents of their respective profiles, as well as any of the attributes of the audio data, and of the words or any of the audio features, with weights or emphases applied as may be desired. The listeners may be ranked or scored according to any standard, such as according to a functional standard, e.g., where the listeners are ranked with respect to one another based on connectivity between their respective devices and the control system. The listeners may be ranked or scored according to an objective standard, e.g., where the listeners are ranked with respect to one another based on their respective attributes. The listeners may be further ranked or scored according to a subjective standard, e.g., by comparing the profiles, the attributes of the audio data, the words represented in the audio data or the sentiments or other features of the audio data to one or more thresholds or requirements of an episode of a media program. Alternatively, the listeners may be ranked or scored with respect to one another, or with respect to any standard, in any other manner.

In some implementations, a score or a rating may be calculated as a weighted sum or in any other manner. For example, where a listener having a specific background (e.g., an education level of the listener, a past experience of the listener, or a job or a position held or previously held by the listener), a location, a qualification or history, or a listener that is a member of a specific demographic, is a priority to a creator or for a given episode of a media program, the profiles of the listeners may be considered more strongly than the attributes of the audio data, the words, or the audio features in ranking or scoring the listeners. Alternatively, where connectivity with guests is a priority to a creator or for a given episode of a media program, e.g., to ensure that a communications channel between a device of a guest and the control system remains open during the episode, the attributes of the audio data may be considered more strongly than the profiles, the words, or the audio features in ranking or scoring the listeners. Where content, sentiments, tones or other features are priorities to a creator or for a given episode of a media program, e.g., to maximize a likelihood that the episode of the media program will comply with all relevant content-based regulations or requirements, the words represented in the audio data, or the audio features (e.g., sentiments, opinions or others) may be considered more strongly than the profiles or the attributes of the audio data, the words in ranking or scoring the listeners.

Moreover, in some implementations, all of the listeners need not be ranked or scored. Instead, only a subset of the listeners may be ranked or scored. Furthermore, in some implementations, a single listener may be selected or authorized to participate in the media program based on one or more of a profile of the listener, attributes of audio data captured by the listener, words spoken by the listener or a sentiment or another audio feature of the audio data, and each of the other listeners need not be ranked or scored.

At box 490, a ranked list of the listeners is presented to the creator, and the process ends. For example, information or data regarding each of the listeners, or a subset of the listeners, may be presented to the creator in a user interface rendered on a display, such as names of the listeners, or any other information or data regarding the audio data received from the listeners (e.g., measures of transmission quality, service reliability, bandwidth, degradation, or others), information or data stored in the profiles of the listeners, or information or data regarding words used by the listeners or features of the audio data. The user interface may further include one or more buttons or other interactive features for initiating connections with one or more of the listeners, any of which may be selected to authorize one of the listeners to participate in the media program, e.g., by causing a two-way communications channel to be opened between the control system and a device of a listener, or in any other manner.

In some implementations, listeners may be invited to provide media content for inclusion in a media program, without participating in the media program, and media content provided by the listeners may be processed to determine which of the media content is an appropriate or best fit for the media program. For example, a creator may utter one or more words or phrases such as, "we are talking about the latest movie by a top actor, please send us any feedback about the movie that you may have!" or "if you watched the big game last night, tell us what you think!" Listeners to the media program may utter one or more words or phrases, which may be captured by microphones or other sensors of their computer devices or systems and transmitted to a control system over one or more networks. A control system may process the media content, e.g., according to one or more process steps represented in boxes 430, 440, 450, 460, 470 and 480 of the flow chart 400 of FIG. 4 described above, or other process steps, and identify media content that is an appropriate or best fit for the media program accordingly. For example, the media content, or the listeners that provided the media content, may be ranked or scored according to any standard, and the media content, may be authorized for inclusion in the media program accordingly.

Although the disclosure has been described herein using exemplary techniques, components, and/or processes for implementing the systems and methods of the present disclosure, it should be understood by those skilled in the art that other techniques, components, and/or processes or other combinations and sequences of the techniques, components, and/or processes described herein may be used or performed that achieve the same function(s) and/or result(s) described herein and which are included within the scope of the present disclosure.

Likewise, although some of the embodiments described herein or shown in the accompanying figures refer to media programs including audio files, the systems and methods disclosed herein are not so limited, and the media programs described herein may include any type or form of media content, including not only audio but also video, which may be transmitted to and played on any number of devices of any type or form.

It should be understood that, unless otherwise explicitly or implicitly indicated herein, any of the features, characteristics, alternatives or modifications described regarding a particular embodiment herein may also be applied, used, or incorporated with any other embodiment described herein, and that the drawings and detailed description of the present disclosure are intended to cover all modifications, equivalents and alternatives to the various embodiments as defined by the appended claims. Moreover, with respect to the one or more methods or processes of the present disclosure described herein, including but not limited to the flow chart shown in FIG. 4, orders in which such methods or processes are presented are not intended to be construed as any limitation on the claimed inventions, and any number of the method or process steps or boxes described herein can be combined in any order and/or in parallel to implement the methods or processes described herein.

Additionally, it should be appreciated that the detailed description is set forth with reference to the accompanying drawings, which are not drawn to scale. In the drawings, the use of the same or similar reference numbers in different figures indicates the same or similar items or features. Except where otherwise noted, one or more left-most digit(s) of a reference number identify a figure or figures in which the reference number first appears, while two rightmost digits of a reference number in a figure indicate a component or a feature that is similar to components or features having reference numbers with the same two rightmost digits in other figures.

Conditional language, such as, among others, "can," "could," "might," or "may," unless specifically stated otherwise, or otherwise understood within the context as used, is generally intended to convey in a permissive manner that certain embodiments could include, or have the potential to include, but do not mandate or require, certain features, elements and/or steps. In a similar manner, terms such as "include," "including" and "includes" are generally intended to mean "including, but not limited to." Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

The elements of a method, process, or algorithm described in connection with the embodiments disclosed herein can be embodied directly in hardware, in a software module stored in one or more memory devices and executed by one or more processors, or in a combination of the two. A software module can reside in RAM, flash memory, ROM, EPROM, EEPROM, registers, a hard disk, a removable disk, a CD-ROM, a DVD-ROM or any other form of non-transitory computer-readable storage medium, media, or physical computer storage known in the art. An example storage medium can be coupled to the processor such that the processor can read information from, and write information to, the storage medium. In the alternative, the storage medium can be integral to the processor. The storage medium can be volatile or nonvolatile. The processor and the storage medium can reside in an ASIC. The ASIC can reside in a user terminal. In the alternative, the processor and the storage medium can reside as discrete components in a user terminal.

Disjunctive language such as the phrase "at least one of X, Y, or Z," or "at least one of X, Y and Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

Language of degree used herein, such as the terms "about," "approximately," "generally," "nearly" or "substantially" as used herein, represent a value, amount, or characteristic close to the stated value, amount, or characteristic that still performs a desired function or achieves a desired result. For example, the terms "about," "approximately," "generally," "nearly" or "substantially" may refer to an amount that is within less than 10% of, within less than 5% of, within less than 1% of, within less than 0.1% of, and within less than 0.01% of the stated amount.

Although the invention has been described and illustrated with respect to illustrative embodiments thereof, the foregoing and various other additions and omissions may be made therein and thereto without departing from the spirit and scope of the present disclosure.

What is claimed is:

1. A first computer system comprising at least one data store and at least one computer processor,
    wherein the first computer system is connected to one or more networks,
    wherein the at least one data store has one or more sets of instructions stored thereon that, when executed by the at least one computer processor, cause the first computer system to perform a method comprising:
        receiving a first set of audio data from a second computer system over the one or more networks, wherein the second computer system is associated with a creator of a media program, and wherein the first set of audio data represents one or more sets of words spoken by the creator and captured by the second computer system;
        transmitting at least a portion of the first set of audio data to a plurality of computer systems over the one or more networks in accordance with an episode of the media program, wherein each of the plurality of computer systems is associated with at least one listener to the episode of the media program;
        receiving sets of audio data from a subset of the plurality of computer systems over the one or more networks, wherein each of the sets of audio data is received from one of the subset of the plurality of computer systems, and wherein each of the sets of audio data represents a set of words spoken by a listener to the media program and captured by one of the computer systems of the subset;
        determining at least one attribute of each of the sets of audio data received from the subset of the plurality of computer systems;
        identifying a set of words represented in each of the sets of audio data received from the subset of the plurality of computer systems;
        determining at least one sentiment of each of the sets of audio data received from the subset of the plurality of computer systems, wherein the at least one sentiment is determined according to one or more machine learning algorithms based at least in part on the at least one attribute of one of the sets of audio data received from the subset of the plurality of computer systems and the set of words represented in the one of the sets received from the subset of the plurality of computer systems;
        selecting one of the plurality of listeners based at least in part on:
            at least one attribute of a second set of audio data received from one of the plurality of computer systems associated with the selected one of the plurality of listeners;
            a set of words represented in the second set of audio data; and
            a sentiment of the second set of audio data;
        receiving a third set of audio data from a third computer system over the one or more networks, wherein the third computer system is associated with the selected one of the plurality of listeners, and wherein the third set of audio data represents one or more sets of words spoken by the selected one of the plurality of listeners and captured by the third computer system; and
        transmitting at least a portion of the third set of audio data to the plurality of computer systems over the one or more networks in accordance with the episode of the media program.

2. The first computer system of claim 1, wherein the method further comprises:
    prior to receiving the first set of audio data from the second computer system,
        establishing one-way audio communications channels with each of the plurality of computer systems, wherein the third computer system is one of the plurality of computer systems; and
    after selecting the one of the plurality of listeners,
        terminating the one-way audio communications channel between the first computer system and the third computer system; and
        establishing, by the first computer system, a two-way audio communications channel between the first computer system and the third computer system.

3. The first computer system of claim 1, wherein the at least one attribute of each of the sets of audio data is one of:
    a size of a set of the audio data;
    a format of the set of the audio data;
    a duration of the set of the audio data;
    a number of audio channels represented in the set of the audio data;
    an intensity of the set of the audio data;
    a sampling rate of the set of the audio data; or
    a bit depth of the set of the audio data.

4. A method comprising:
    transmitting, by a first computer system, first audio data associated with an episode of a first media program over one or more networks to at least a second computer system associated with a first listener to the episode of the first media program;
    receiving, by the first computer system, second audio data from the second computer system over the one or more networks, wherein the second audio data represents at least a set of words spoken by the first listener;
    determining, by the first computer system, information regarding the first listener based at least in part on the second audio data;
    determining, by the first computer system, at least one attribute of the second audio data;
    identifying, by the first computer system, at least a portion of the set of words spoken by the first listener based at least in part on the second audio data;
    determining, by the first computer system, that the first listener is authorized to participate in the episode of the first media program based at least in part on at least:
        the information regarding the first listener;
        the at least one attribute of the second audio data; and the portion of the set of words spoken by the first listener; and in response to determining that the first listener is authorized to participate in the episode of the first media program, transmitting, by the first computer system, at least a portion of the information regarding the first listener to a third computer system associated with a creator of the first media program over the one or more networks.

5. The method of claim 4, further comprising:

prior to transmitting the first audio data associated with the episode of the first media program over the one or more networks to at least the second computer system, receiving, by the first computer system, third audio data from the third computer system over the one or more networks, wherein the third audio data represents a set of words spoken by the creator, wherein the first audio data comprises at least a portion of the third audio data.

6. The method of claim 4, wherein the at least one attribute of the second audio data is one of:
a size of the second audio data;
a format of the second audio data;
a duration of the second audio data;
a number of audio channels represented in the second audio data;
an intensity of the second audio data;
a sampling rate of the second audio data; or
a bit depth of the second audio data.

7. The method of claim 4, wherein the information regarding the first listener identifies at least one of:
a name of the first listener;
a demographic of the first listener;
a location of the first listener; or
a position held or previously held by the first listener.

8. The method of claim 7, wherein the information regarding the first listener identifies at least one item previously purchased by the first listener or at least a second media program previously listened to by the first listener.

9. The method of claim 4, further comprising:
determining, by the first computer system, at least one feature of the second audio data, wherein the at least one feature comprises at least one of:
an opinion expressed in the second audio data;
a sentiment of the second audio data;
a theme of the second audio data;
a tone of the second audio data; or
a topic of the second audio data, and wherein the first listener is determined to be authorized to participate in the episode of the first media program based at least in part on the information regarding the first listener, the at least one attribute of the second audio data, the portion of the set of words spoken by the first listener and the at least one feature of the second audio data.

10. The method of claim 9, further comprising:
determining, by the first computer system, at least one feature of the first audio data, wherein the at least one feature comprises at least one of:
an opinion expressed in the first audio data;
a sentiment of the first audio data;
a theme of the first audio data;
a tone of the first audio data; or
a topic of the first audio data; and determining, by the first computer system, that the at least one feature of the second audio data is consistent with the at least one feature of the first audio data, wherein the first listener is determined to be authorized to participate in the episode of the first media program in response to determining that the at least one feature of the second audio data is consistent with the at least one feature of the first audio data.

11. The method of claim 4, further comprising:
establishing, by the first computer system, one-way audio communications channels with each of a plurality of computer systems, wherein the second computer system is one of the plurality of computer systems;

transmitting, by the first computer system, the first audio data to the plurality of computer systems over the one-way audio communications channels, wherein the second computer system is one of the plurality of computer systems; and in response to authorizing the first listener to participate in the episode of the first media program, terminating, by the first computer system, the one-way audio communications channel between the first computer system and the second computer system; and establishing, by the first computer system, a two-way audio communications channel between the first computer system and the second computer system.

12. The method of claim 4, further comprising:
receiving, by the first computer system, sets of audio data from each of a plurality of computer systems over the one or more networks, wherein each of the sets of audio data represents a set of words spoken by one of a plurality of listeners to the media program, and wherein the second audio data is one of the sets of audio data;

determining, by the first computer system, information regarding each of the plurality of listeners based at least in part on the sets of audio data;

determining, by the first computer system, at least one attribute of each of the sets of audio data;

identifying, by the first computer system, portions of the sets of words spoken by each of the listeners based at least in part on the sets of audio data;

selecting, by the first computer system, one of the plurality of listeners based at least in part on:
the information regarding each of the plurality of listeners;
the at least one attribute of each of the sets of audio data;
the portions of the sets of words spoken by each of the listeners;

wherein the first listener is the selected one of the plurality of listeners.

13. The method of claim 12, further comprising:
causing, by the first computer system, a display of a user interface on a display of the third computer system, wherein the user interface comprises:
portions of the information regarding each of the plurality of listeners;
the at least one attribute of each of the plurality of listeners;
a plurality of interactive features, wherein each of the interactive features corresponds to one of the plurality of listeners, and wherein each of the interactive features, when selected, causes a two-way audio communications channel to be established between the first computer system and one of the plurality of computer systems.

14. The method of claim 13, further comprising:
receiving, by the first computer system from the second computer system, a selection of the interactive feature corresponding to the first listener; and
in response to receiving the selection of the interactive feature corresponding to the first listener,
establishing, by the first computer system, a two-way audio communications channel between the first computer system and the third computer system.

15. The method of claim 12, wherein authorizing the first listener to participate in the episode of the first media program comprises:
calculating, by the first computer system, scores for each of the plurality of listeners, wherein each of the scores is calculated for one of the plurality of listeners based at least in part on information regarding the one of the plurality of listeners, at least one attribute of a set of audio data received from one of the plurality of computer systems, and a portion of a set of words spoken by one of the plurality of listeners; and
determining, by the first computer system, that a score calculated for the first listener exceeds a predetermined threshold,
wherein the first listener is determined to be authorized to participate in the episode of the first media program in response to determining that the score exceeds a predetermined threshold.

16. The method of claim 15, wherein each of the scores is calculated according to a weighted sum formula.

17. The method of claim 4, further comprising:
automatically establishing, by the first computer system, a two-way audio communications channel between the first computer system and the second computer system.

18. A method comprising:
receiving, by a first computer system, a plurality of sets of audio data from each of a plurality of computer systems over one or more networks, wherein each of the plurality of computer systems is associated with one of a plurality of listeners to a media program;
determining, by the first computer system, at least one attribute of each of the sets of audio data, wherein each of the sets of audio data represents at least a set of words spoken by one of the plurality of listeners, and wherein the at least one attribute is one of:
a size of one of the sets of audio data;
a format of the one of the sets of audio data;
a duration of the one of the sets of audio data;
a number of audio channels represented in the one of the sets of audio data;
an intensity of the one of the sets of audio data;
a sampling rate of the one of the sets of audio data; or
a bit depth of the one of the sets of audio data;
identifying, by the first computer system for each of the sets of audio data, a profile of the one of the plurality of listeners;
identifying, by the first computer system for each of the sets of audio data, the set of words represented in one of the sets of audio data spoken by one of the plurality of listeners;
determining, by the first computer system, a ranking of the sets of data or the plurality of listeners based at least in part on:
the at least one attribute of each of the sets of audio data;
information represented in the profiles of the listeners; and
the sets of words spoken by the plurality of listeners represented in the sets of audio data;
selecting, by the first computer system, one of the sets of data based at least in part on the ranking; and
transmitting, by the first computer system, the selected one of the sets of data to at least the plurality of computer systems over the one or more networks.

19. The method of claim 18, further comprising:
determining, by the first computer system, at least one audio feature of each of the sets of audio data, wherein the at least one audio feature is one of:
an opinion expressed in the one of the sets of audio data;
a sentiment of the one of the sets of audio data;
a theme of the one of the sets of audio data;
a tone of the one of the sets of audio data; or
a topic of the one of the sets of audio data; and
wherein the ranking is determined based at least in part on the at least one audio feature of each of the sets of audio data.

20. The method of claim 18, further comprising:
causing, by the first computer system, a display of a user interface on a display of a computer system associated with a creator of the media program, wherein the user interface comprises:
information regarding at least some of the sets of data; and
a plurality of interactive features, wherein each of the interactive features corresponds to one of the sets of data, and wherein each of the interactive features, when selected, causes the first computer system to transmit one of the sets of data to each of the plurality of computer systems,
wherein selecting the one of the sets of data based at least in part on the ranking comprises:
receiving, by the first computer system from the computer system associated with the creator, a selection of the interactive feature corresponding to the selected one of the sets of data,
wherein the selected one of the sets of data is transmitted to at least the plurality of computer devices in response to receiving the selection of the interactive feature corresponding to the selected one of the sets of data.

* * * * *